United States Patent
Hugard, IV et al.

(10) Patent No.: US 9,516,451 B2
(45) Date of Patent: Dec. 6, 2016

(54) OPPORTUNISTIC SYSTEM SCANNING

(75) Inventors: James Michael Hugard, IV, Mission Viejo, CA (US); Sven Schrecker, San Marcos, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/443,729

(22) Filed: Apr. 10, 2012

(65) Prior Publication Data

US 2013/0268652 A1    Oct. 10, 2013

(51) Int. Cl.
*H04W 4/00* (2009.01)

(52) U.S. Cl.
CPC ............ *H04W 4/008* (2013.01); *H04W 4/006* (2013.01)

(58) Field of Classification Search
CPC . H04L 29/08072; H04L 29/06; H04L 43/00; H04L 12/2602; H04L 41/22
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,574,737 B1 * | 6/2003 | Kingsford | H04L 63/1433 709/224 |
| 6,792,543 B2 | 9/2004 | Pak et al. | |
| 7,003,560 B1 | 2/2006 | Mullen et al. | |
| 7,152,105 B2 | 12/2006 | McClure et al. | |
| 7,299,504 B1 | 11/2007 | Tiller et al. | |
| 7,502,939 B2 | 3/2009 | Radatti | |
| 7,506,155 B1 | 3/2009 | Stewart et al. | |
| 7,543,056 B2 | 6/2009 | McClure et al. | |
| 7,712,138 B2 | 5/2010 | Zobel et al. | |
| 8,800,046 B2 | 8/2014 | Nakawatase et al. | |
| 8,954,573 B2 | 2/2015 | Hugard, IV et al. | |
| 8,955,036 B2 | 2/2015 | Hugard, IV et al. | |
| 9,049,207 B2 | 6/2015 | Hugard, IV et al. | |
| 2002/0104014 A1 | 8/2002 | Zobel et al. | |
| 2002/0126642 A1 | 9/2002 | Shitama | |
| 2002/0172207 A1 | 11/2002 | Saito et al. | |
| 2003/0018694 A1 | 1/2003 | Chen et al. | |
| 2003/0028803 A1 | 2/2003 | Bunker et al. | |
| 2003/0033536 A1 | 2/2003 | Pak et al. | |

(Continued)

FOREIGN PATENT DOCUMENTS

| | | |
|---|---|---|
| CN | 101569226 A | 10/2009 |
| CN | 101803329 A | 8/2010 |

(Continued)

OTHER PUBLICATIONS

International Preliminary Report on Patentability mailed Oct. 14, 2014 from International Application No. PCT/US2013/036168, 7 pages. International Preliminary Report on Patentability mailed Oct. 14, 2014 from International Application No. PCT/US2013/036025, 6 pages.

(Continued)

*Primary Examiner* — Vivek Srivastava
*Assistant Examiner* — Hien Doan
(74) *Attorney, Agent, or Firm* — Patent Capital Group

(57) ABSTRACT

Opportunistic scans can be performed by identifying, using at least one processing device, a detection of a particular computing device on a network of a computing environment. At least one scan to be performed on the detected particular computing device can be is identified and a particular scan engine, in a plurality of scan engines, is identified that is adapted to perform the at least one scan. The at least one scan is caused to be performed on the detected particular computing device while the detected particular computing device is on the network using the particular scan engine.

19 Claims, 13 Drawing Sheets

(56) References Cited

U.S. PATENT DOCUMENTS

| | | | |
|---|---|---|---|
| 2004/0015728 A1* | 1/2004 | Cole et al. ................... | 713/201 |
| 2004/0093408 A1 | 5/2004 | Hirani et al. | |
| 2004/0128374 A1 | 7/2004 | Hodges et al. | |
| 2004/0139187 A1 | 7/2004 | Park | |
| 2004/0193449 A1 | 9/2004 | Wildman et al. | |
| 2004/0193918 A1 | 9/2004 | Green et al. | |
| 2004/0264465 A1 | 12/2004 | Dunk | |
| 2005/0010821 A1 | 1/2005 | Cooper et al. | |
| 2005/0097199 A1 | 5/2005 | Woodard et al. | |
| 2006/0085852 A1 | 4/2006 | Sima | |
| 2006/0161444 A1 | 7/2006 | Lubrecht et al. | |
| 2006/0164296 A1 | 7/2006 | LaMothe et al. | |
| 2007/0113287 A1 | 5/2007 | Blumenau et al. | |
| 2007/0171842 A1 | 7/2007 | Dow | |
| 2007/0177550 A1 | 8/2007 | Kwon et al. | |
| 2007/0180490 A1 | 8/2007 | Renzi et al. | |
| 2007/0250935 A1 | 10/2007 | Zobel et al. | |
| 2007/0253431 A1 | 11/2007 | Park et al. | |
| 2007/0283441 A1 | 12/2007 | Cole et al. | |
| 2008/0005784 A1 | 1/2008 | Miliefsky | |
| 2008/0008179 A1 | 1/2008 | Chen et al. | |
| 2008/0049644 A1* | 2/2008 | Halbert ................... | 370/254 |
| 2008/0092237 A1 | 4/2008 | Yoon et al. | |
| 2008/0133486 A1 | 6/2008 | Fitzgerald et al. | |
| 2008/0165738 A1* | 7/2008 | Barber ................... | H04W 80/04 370/331 |
| 2008/0228908 A1 | 9/2008 | Link et al. | |
| 2008/0235801 A1 | 9/2008 | Soderberg et al. | |
| 2008/0284569 A1 | 11/2008 | Shah | |
| 2009/0106844 A1 | 4/2009 | Yoon et al. | |
| 2009/0138583 A1 | 5/2009 | Childress et al. | |
| 2009/0187992 A1 | 7/2009 | Poston | |
| 2009/0328033 A1 | 12/2009 | Kohavi et al. | |
| 2010/0043066 A1 | 2/2010 | Miliefsky | |
| 2010/0064362 A1 | 3/2010 | Materna et al. | |
| 2010/0083381 A1 | 4/2010 | Khosravi et al. | |
| 2010/0131547 A1 | 5/2010 | Magrath et al. | |
| 2010/0165947 A1 | 7/2010 | Taniuchi et al. | |
| 2010/0260066 A1 | 10/2010 | August et al. | |
| 2010/0303006 A1 | 12/2010 | Fernandez Gutierrez | |
| 2010/0305990 A1* | 12/2010 | Tyree et al. ................... | 705/7 |
| 2011/0055374 A1 | 3/2011 | Christenson et al. | |
| 2012/0030241 A1 | 2/2012 | Lupoli et al. | |
| 2012/0030757 A1 | 2/2012 | Baikalov et al. | |
| 2012/0192273 A1* | 7/2012 | Turbin ................... | G06F 21/56 726/23 |
| 2012/0233330 A1 | 9/2012 | Arwe et al. | |
| 2013/0111065 A1 | 5/2013 | Donley et al. | |
| 2013/0269028 A1 | 10/2013 | Nakawatase et al. | |
| 2013/0269029 A1 | 10/2013 | Nakawatase et al. | |
| 2013/0275574 A1 | 10/2013 | Hugard IV et al. | |
| 2013/0275575 A1 | 10/2013 | Hugard, IV et al. | |
| 2013/0276053 A1 | 10/2013 | Hugard, IV et al. | |

FOREIGN PATENT DOCUMENTS

| | | |
|---|---|---|
| EP | 0991227 B1 | 12/2005 |
| EP | 2 053 530 A1 | 4/2009 |
| KR | 200200439 94 | 6/2002 |
| KR | 10-2004-0041775 A | 5/2004 |
| WO | WO 2004/075006 A2 | 9/2004 |
| WO | WO 2013/155219 A1 | 10/2013 |
| WO | WO 2013/155230 A1 | 10/2013 |
| WO | WO 2013/155236 A1 | 10/2013 |
| WO | WO 2013/155302 A1 | 10/2013 |
| WO | WO 2013/155344 A1 | 10/2013 |
| WO | WO 2013/155357 A1 | 10/2013 |

OTHER PUBLICATIONS

International Preliminary Report on Patentability mailed Oct. 14, 2014 from International Application No. PCT/US2013/036257, 5 pages.
International Preliminary Report on Patentability mailed Oct. 14, 2014 from International Application No. PCT/US2013/036050, 6 pages.
International Preliminary Report on Patentability mailed Oct. 14, 2014 from International Application No. PCT/US2013/036239, 6 pages.
International Preliminary Report on Patentability mailed Oct. 14, 2014 from International Application No. PCT/US2013/036039, 6 pages.
International Search Report and Written Opinion received for the PCT Patent Application No. PCT/US2013/036168, mailed on Jul. 26, 2013, 9 pages.
International Search Report and Written Opinion received for PCT Patent Application No. PCT/US2013/036039, mailed on Jul. 26, 2013, 9 pages.
Office Action received for U.S. Appl. No. 13/443,325, mailed on Aug. 6, 2013, 9 pages.
International Search Report and Written Opinion received for PCT Patent Application No. PCT/US2013/036257, mailed on Jul. 25, 2013, 4 pages.
Sung, Jongwoo, et al., "The EPC Sensor Network for RFID and WSN Integration Infrastructure," Mar. 23, 2007, IEEE, pp. 618-621, 4 pages.
International Search Report and Written Opinion mailed Aug. 21, 2013 from International Application No. PCT/US2013/036050, 8 pages.
U.S. Appl. No. 13/444,143, filed Apr. 11, 2012, entitled, "Asset Detection System," Inventor(s) James Michael Hugard, IV, et al.
U.S. Appl. No. 13/444,281, filed Apr. 11, 2012, entitled, "System Asset Repository Management," Inventor(s) James Michael Hugard, IV, et al.
U.S. Appl. No. 13/444,459, filed Apr. 11, 2012, entitled, "Network Address Repository Management," Inventor(s) James Michael Hugard, IV, et al.
U.S. Appl. No. 13/443,176, filed Apr. 10, 2012, entitled, "Unified Scan Management," Inventor(s) Ryan Tadashi Nakawatase, et al.
U.S. Appl. No. 13/443,325, filed Apr. 10, 2012, entitled, "Unified Scan Engine," Inventor(s) Ryan Tadashi Nakawatase, et al.
International Search Report and Written Opinion mailed Jul. 25, 2013 from International Application No. PCT/US2013/036239, 8 pages.
USPTO Mar. 12, 2015 Nonfinal Rejection from U.S. Appl. No. 13/443,176, 22 pages.
International Search Report and Written Opinion mailed Jun. 17, 2013 from International Application No. PCT/US2013/036025.
USPTO Sep. 10, 2015 Final Rejection from U.S. Appl. No. 13/443,176, 23 pages.
Supplementary European Search Report in EP Application No. 13 77 5420, mailed on Nov. 4, 2015, 6 pages.
Supplementary European Search Report in EP Application No. 13 77 4995, mailed on Oct. 16, 2015, 6 pages.
Supplementary European Search Report in EP Application No. 13 77 4977, mailed on Nov. 5, 2015, 5 pages.
Supplementary European Search Report in EP Application No. 13 77 6061, mailed on Nov. 11, 2015, 6 pages.
Supplementary European Search Report in EP Application No. 13 77 5380, mailed on Nov. 11, 2015, 7 pages.
USPTO Mar. 28, 2016 Notice of Allowance from U.S. Appl. No. 13/443,176, 9 pages.
Office Action in CN Application No. 201380017187.X, mailed on Apr. 21, 2016, no English translation, 10 pages.
Supplementary European Search Report in EP Application No. 13 77 5243, mailed on Sep. 29, 2015, 6 pages.
Office Action and Search Report in CN Application No. 201380017128.2, mailed on Jun. 3, 2016, English translation, 10 pages.
Office Action and Search Report in CN Application No. 201380017187.X, mailed on Apr. 21, 2016, English translation, 20 pages.
Office Action in CN Application No. 201380017011.4, mailed on Jun. 14, 2016, no English translation, 7 pages.

* cited by examiner

US 9,516,451 B2

OPPORTUNISTIC SYSTEM SCANNING

TECHNICAL FIELD

This disclosure relates in general to the field of computing security and, more particularly, to security scanning.

BACKGROUND

Modern organizations concern themselves more and more with maintaining the reliability and security of their computing environments given the pivotal role computer networks play in intra-entity and inter-entity communications and transactions. Various tools have been used by network administrators, government, security consultants, and hackers to test the vulnerabilities of target networks, such as, for example, whether any computers on a network can be accessed and controlled remotely without authorization. Some network security tools can test network paths for possible intrusion. From a testing point, simple commands such as traceroute and ping can be used to manually map a network topography, and determine roughly what network addresses are "alive" and which computers are "awake" on the network (i.e., determine which computers are on and are responding to network packets). A tool such as a port scanner can be used to test an individual target computer on the target network to determine what network ports are open. If open ports are found, these ports may provide access for possible intrusion, and potentially represent a vulnerability that can be exploited by a malicious hacker. Network security tools can perform various tests and scans of computers in a network, performing the scans on all or a portion of the computing environment, for instance, according to a particular scanning session.

BRIEF DESCRIPTION OF THE DRAWINGS

Like reference numbers and designations in the various drawings indicate like elements.

DETAILED DESCRIPTION OF EXAMPLE EMBODIMENTS

Overview

Figure 1:
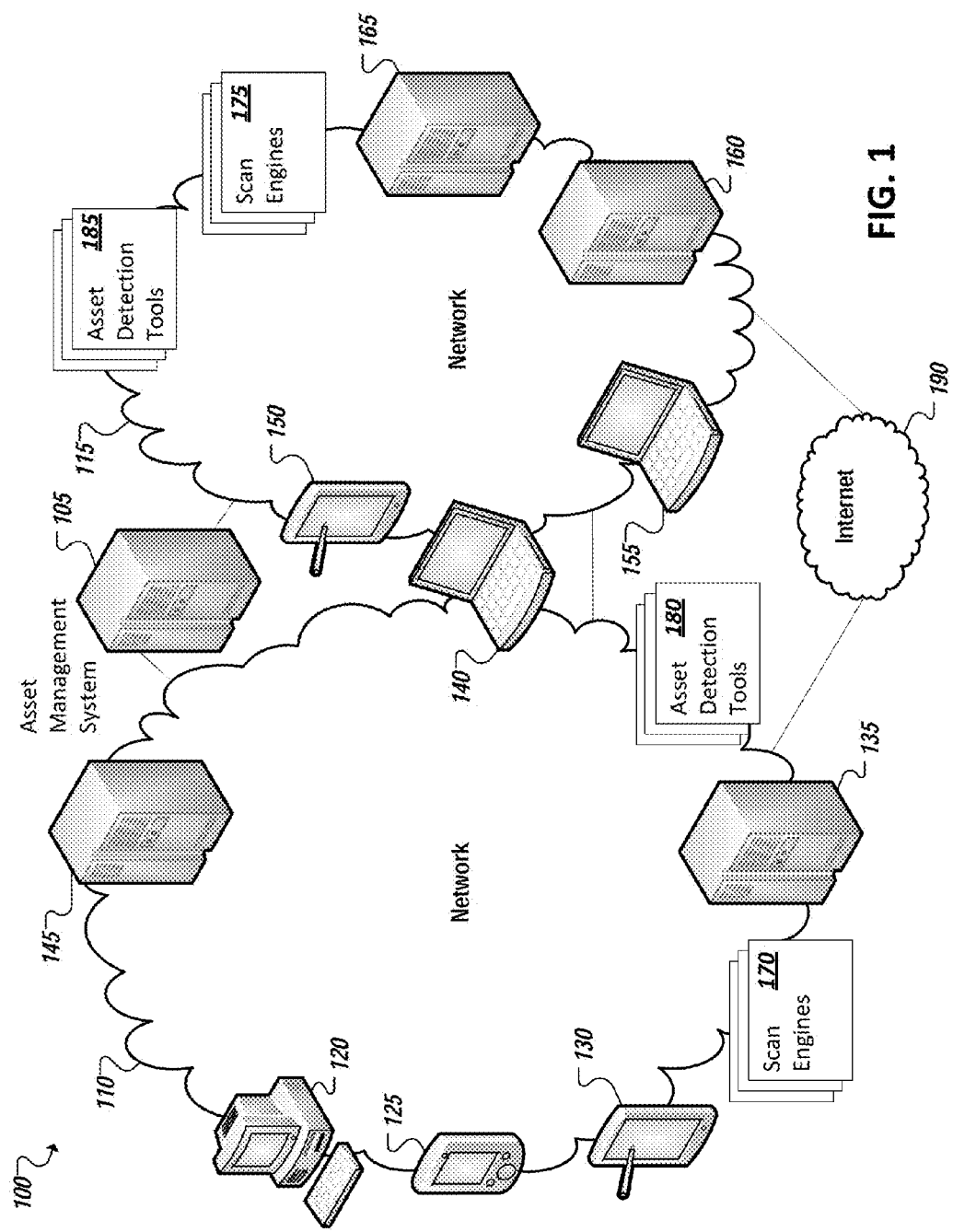
FIG. 1 is a simplified schematic diagram of an example computing system including an example asset management system in accordance with at least one embodiment.

In general, one aspect of the subject matter described in this specification can be embodied in methods that include the actions of identifying, using at least one processing device, a detection of a particular computing device on a network of a computing environment. At least one scan to be performed on the detected particular computing device can be identified and a particular scan engine, in a plurality of scan engines, can be identified that is adapted to perform the at least one scan. The at least one scan can be caused to be performed on the detected particular computing device while the detected particular computing device is on the network using the particular scan engine.

In another general aspect of the subject matter described in this specification can be embodied in systems that include at least one processor device, at least one memory element, and an asset manager. The asset manager can be adapted, when executed by the at least one processor device, to receive a request to identify a detection of a particular computing device on a network of a computing environment, identify at least one scan to be performed on the detected particular computing device, identify a particular scan engine in a plurality of scan engines adapted to perform the at least one scan, and cause the at least one scan to be performed on the detected computing device while the detected computing device is on the network using the particular scan engine. In some implementations, the systems can include an asset detection engine adapted to detect activity of computing devices within the network and obtain identifications of the detected computing devices, as well as, in some instance, the plurality of scan engines.

These and other embodiments can each optionally include one or more of the following features. The particular scan engine can be remote from the detected particular computing device. The particular scan engine can be adapted to perform network-based scans of remote computing devices. Scan results of the performed at least one scan can be received. The particular computing device can be a mobile computing device. The particular computing device can be detected by an asset detection tool on the network and detection of the particular computing device can be identified from a message from the asset detection tool. The asset detection tool can be a passive detection tool. The particular computing device can be detected from data collected by a service in the network in connection with an event identified by the service. The particular computing device can also be detected from address information corresponding to the particular computing device included in traffic communicated in the network. Further, the particular computing device can be detected from address information added to a data store of a service within the network. The particular scan engine can be identified as associated with the asset detection tool detecting the particular computing device and the asset detection tool can be one of a plurality of asset detection tools in the computing environment. Identifying the particular scan engine as associated with the asset detection tool can include querying a mapping of scan engines to asset detection tools.

Further, these and other embodiments can also each optionally include one or more of the following features. The asset detection tool can be an active detection tool adapted to probe computing devices and detect whether computing devices are present on the network based on the probing. Causing the at least one scan to be performed can include sending a scan request to the identified particular scan engine. The scan request can include a scan script that, when executed by the particular scan engine, causes the particular scan engine to perform the at least one scan. A plurality of scans can be identified to be performed on the detected particular computing device. At least two different scan engines can be identified to perform respective scans in the plurality of scans and two or more of the plurality of scans can be caused to be performed. It can be identified that the identified particular computing device is designated as a device to be scanned using the at least one scan in response to detection of the particular computing device within networks of the computing environment. In some implementations, detection of a second computing device on the network of the computing environment can be identified and at least one second scan to be performed on the detected second computing device can be identified. A scan engine in the plurality of scan engines can be identified that is adapted to perform the at least one second scan and the at least one second scan can be caused to be performed on the detected second computing device while the detected second computing device is on the network.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example implementation of a computing environment 100 including an asset management system 105 managing assets of the computing environment 100 including one or more networks (e.g., 110, 115) and computing devices (e.g., 120, 125, 130, 140, 145, 150, 155, 160, 165) within the networks 110, 115. Such computing devices can include user computing devices (e.g., 120, 125, 130, 140, 150, 155), server devices serving various services, data, applications, and other resources within the computing environment (e.g., 135, 145, 160, 165), and other host devices.

The computing environment 100 can additionally include scan engines 170, 175 deployed in the networks 110, 115 adapted to probe, test, attempt to access, and otherwise scan the devices (e.g., 120, 125, 130, 140, 150, 155) in the computing environment according to one or more of a variety of scans. Some scan engines 170, 175 can include functionality for performing multiple different types of scans while other scan engines can be specialized scan engines adapted to perform a particular type of scan, scan particular types of devices on the computing environment, etc. Through the scans, scan engines 170, 175 can attempt to obtain information regarding attributes of the various elements of the computing environment 100, its respective host devices (e.g., 110, 115, 120, 125, 130, 135, 140), applications and services hosted by the devices, and networks (e.g., 145) within the computing environment 100, as well as individual network elements, such as routers, switches, firewalls, etc. Such attributes can include the type of host, the operating system of the host, hardware profile of the host, applications of the host (and attributes of these applications), ports used by the host, vulnerabilities possessed by the host, the location of the host, the user of the host, etc. Indeed, in some implementations, scan engines 170, 175 can scan host devices to additionally obtain information describing attributes of various users/persons using the computing environment 100 (e.g., through the scanned host), as well as behavioral tendencies of the users/persons. Data generated, discovered, and/or collected by scan engines 170, 175 through various scans of the computing environment can be sent to an at least partially centralized asset management system 105 for aggregating, synthesizing, and otherwise processing the result data as it is generated in connection with security-related assessments of the computing environment 100.

In traditional systems, scan engines can be run according to particular schedules, on a periodic basis, according to an administrator request, etc. In some instances, a particular scan of a scan engine can be attempted to be run against a number of host devices within the computing environment at substantially the same time (e.g., at a time when scanning is believed to be the least disruptive, etc.), for instance, during a defined scan window. Indeed, in such instances, scans can be run under the assumption that most targeted hosts are present on a network of the computing environment 100 at the time of the scan. In practice, however, this is not always true. For instance, particularly as computing devices become more mobile, computing devices may move on and off networks of the computing environment. As a result, a scan of at least a portion of the computing environment may miss certain targeted host devices that are not on the network at the time of the scan. In traditional scenarios, such realities are sometimes addressed by staggering or randomizing the scheduling of scans, based on the assumption that eventually host devices missed in a previous scan will be on the network during a future scan. This is a less than optimal solution, particular in instances where an urgent scan is to be performed or where particular host devices (e.g., by virtue of their user's use behavior) are off the networks 110, 115 more often than they are on. Further, increasing the frequency or randomizing the scheduling of scans can additionally result in redundant scanning of some host devices in the computing environment in attempts to catch certain hosts missed in previous scans, among other examples and difficulties.

The example system described in FIG. 1 and implemented in accordance with at least some of the principles described herein can, in some cases, overcome the above-discussed deficiencies, as well as others not explicitly described herein. For instance, an example asset management system 105, in some implementations, can at least partially centralize control of scans performed by scan engines 170, 175 as well as the processing of scan result data obtained from the scans so as to perform on-demand scanning of devices in response to detection of the devices. Further, in connection with its management of scans of scan engines 170, 175, asset detection tools (e.g., 180, 185) can additionally be provided and communicate with asset management system 105 in connection with the management of scans of scan engines 170, 175 within the computing environment 100. Such asset detection tools can be provided with functionality to actively and passively collect data and communications within the computing environment to detect the presence of various computing devices within networks 110, 115 of the computing environment. Such detections can be communicated to the asset management system 105 to provide the asset management system 105 with the opportunity to trigger an attempted on-demand scan of the detected computing device, among other examples.

As noted above, system administrators can invest much time and resources into securing a computing environment (e.g., 100) from various threats that exploit particular vulnerabilities of systems in the computing environment. Further, at least portions of the computing environment 100 can be beholden to or governed by particular policies, and monitoring or auditing compliance with these policies can be burdensome endeavor for administrators and the tools they employ in the management of their systems. For instance, endpoint or user devices, network elements, host devices, and other computing devices included in a computing environment 100 can communicate with and/or facilitate communication between other devices, including devices outside the computing environment (e.g., over one or more public networks (e.g., 190)). Vulnerabilities and threats can materialize from devices' participation in computing transactions and communications both inside and outside the computing environment 100. The presence of various vulnerabilities within a system can open the door to the computing environment 100 being harmed by threats exploiting the vulnerabilities, including computer viruses, compromised data, unauthorized system, data, or network access, data theft, worms, malware, hacks, and other threats. Such vulnerabilities and threats can pose risks to one or more devices, sub-networks, or the computing environment itself. Additionally, various policies under which the computing environment is governed can additionally mandate particular compliance with one or more policies by the computing environment. Efficiently and accurately scanning devices and networks within the computing environment 100 can assist in ensuring various security standards and policies are upheld, and that the security and health of the overall computing environment 100 and its constituent elements are maintained.

In general, "servers," "clients," "computing devices," "network elements," "hosts," "host devices," and "systems," including computing devices in example computing environment 100 (e.g., 120, 125, 130, 140, 145, 150, 155, 160, 165, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of devices, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 120, 125, 130, 140, 145, 150, 155, 160, 165, etc.) can each include one or more processors, computer-readable memory, and one or more interfaces, among other features and hardware. Servers can include any suitable software component or module, or computing device(s) capable of hosting and/or serving software applications and services (e.g., the asset management system 105, scan engines 170, 175, asset detection tools 180, 185, security enforcement tools, and other services, applications, and other programs including distributed, enterprise, or cloud-based software applications, data, and services. For instance, servers can be configured to host, serve, or otherwise manage data structures, models, data sets, software services and applications interfacing, coordinating with, or dependent on or used by other services and devices. In some instances, a server, system, subsystem, or computing device can be implemented as some combination of devices that can be hosted on a common computing system, server, server pool, or cloud computing environment and share computing resources, including shared memory, processors, and interfaces.

User, endpoint, or client computing devices (e.g., 120, 125, 130, 140, 150, 155, etc.) can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 110, 115, 190). Attributes of user computing devices, and computing devices generally, can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some computing devices can further include at least one graphical display device and user interfaces allowing a user to view and interact with graphical user interfaces of applications and other programs provided in computing environment 100, including user interfaces and graphical representations of programs interacting with applications hosted within the computing devices as well as graphical user interfaces associated with an asset management system 105, or one or more scan engines 170, 175). Moreover, while user computing devices may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
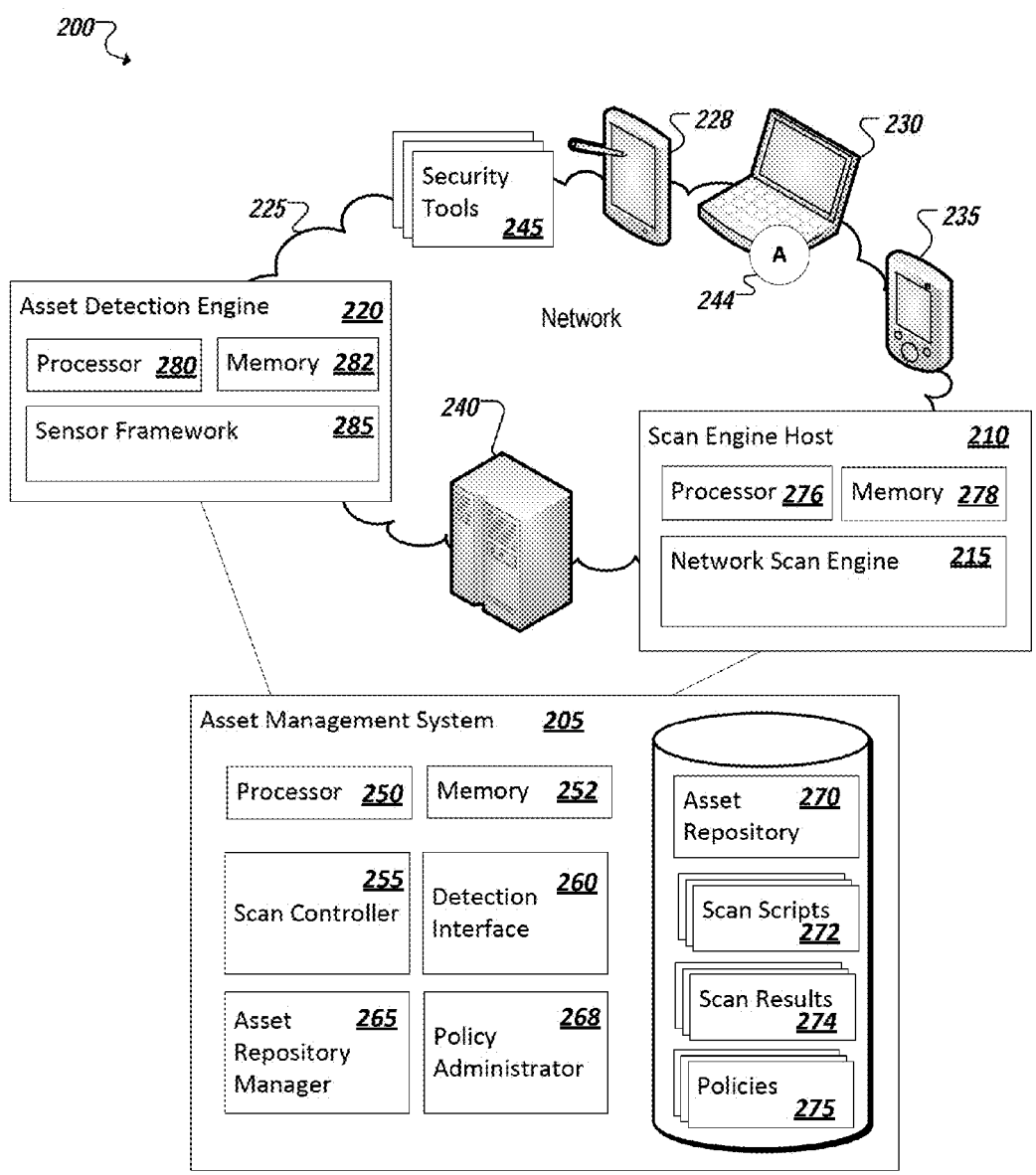
FIG. 2 is a simplified block diagram of an example computing system including an example asset management system, example asset detection tools, and example scan engines in accordance with at least one embodiment.

FIG. 2 is a simplified block diagram 200 illustrating an example system including an example asset management system 205 operating cooperatively with one or more scan engines (e.g., 215) hosted by one or more hosts (e.g., 210) within the computing environment. Asset management system 205 can further communicate with, and in some cases, manage one or more asset detection engines (e.g., 220) also hosted by devices in the computing environment and tasked with discovering computing devices (e.g., typed as "system-type system entities") (e.g., 228, 230, 235, 240) within the network 225, together with addresses and attributes of the discovered devices. The detection of devices within the network by asset detection engines 220 can be communicated to the asset management system for use by the asset management system in dynamically identifying one or more scans to be performed on a discovered device while it remains (potentially temporarily) on the network and within reach of a scan engine adapted to perform the identified scans. The scanning of devices in the network 215 can permit the discovery of further attributes of the devices including vulnerabilities and policy violations present on or through the device that the asset management system 205 can attempt to counter utilizing one or more security tools, including network-based security tools 245 remote from the detected device (e.g., 230) as well as locally-executed (or host-based) security tools, such as tools provided by an agent (e.g., 244) present on the device (e.g., 230), among other examples.

An example asset management system 205 can include one or more processors devices 250 and memory elements 252 used to execute functionality included, in some implementations, in one or more components of the asset management system 205. For instance, in one example implementation of an asset management system 205, a scan controller 255, detection interface module 260, an asset repository manager 265, and policy administrator 268 can be provided. An example scan controller 260, for instance, can include functionality for interfacing with one or more scan engines (e.g., 220, 225) and managing scan sets and individual scans performed by the scan engines. In this way, asset management system 205 can centrally manage scans as well as the information obtained through the scans of the computing environment, including scans across multiple networks within the computing environment. Indeed, asset management system 205 can orchestrate scans involving many scans (i.e., a set of scans) by multiple different scan engines, including both network- and host-based scan engines, and can adapt scan scripts used by the scan engines based on scan results received during one or more portions of the scan set. Further, the result data obtained or generated using one or more different scan engines can be centrally reported to asset management system for aggregation, synthesis, and analysis by the asset management system.

In some instances, policies (e.g., 275) can be associated with one or more components of a computing environment, such as the entire environment, a network, one or more subnets, one or more devices, one or more applications, one or more users, etc. Such policies can include user-centric policies (e.g., applied against a particular user's use of devices and networks of the computing environment), device-centric policies (e.g., applied against particular devices within the computing environment), organization-specific policies (e.g., policies set by an organization governing uses and configurations within a particular organization's computing environment), and regulatory policies (e.g., policies set by industry, government, or other entities setting system requirements and guidelines of computing systems used within particular contexts governed by the entity (e.g., Sarbanes-Oxley system compliance policies, Payment Card Industry (PCI) policies, Health Insurance Portability and Accountability Act (HIPAA) policies, etc.)), among other examples. A scan controller 255 can be adapted to generate particular scans (or identify pre-developed scans, including third-party scans), including sets of scans that involve a sequence of a scans, performed, in some cases, by a plurality of different scan engines, addressing compliance with a particular policy (e.g., 275). A variety of scan scripts 272 can be generated and maintained using scan controller 260 for use in performing scans in connection with one or more policies 275.

Scan scripts 272 can be pushed by a scan controller 255 to one or more particular scan engines 215, for use by the scan engines in performing corresponding scan tasks. A scan script 272 can include executable instructions that, when read or executed by the scan engine, identify particular scan targets, the scans to be performed, as well as, in some instances, the type of computing language to be used by the scan engine in performing the scan task. Execution of a scan script can cause a scan engine to perform one or more scan tasks. In some instances, a scan can involve the collection of data from a particular device or application within the computing environment. A scan can include an attempt (authorized or unauthorized from the perspective of the target) to access particular resources of a target computing device or application. A scan can include monitoring the response of a particular device or application within the computing environment to particular stimuli or data sent to the computing device or application. Indeed, a scan can include the generation of data by a scan engine to be provided as inputs to, communicated to, or otherwise sent to a target of the scan, the scan engine further monitoring the response of the scan target to the sent data. Such data, sent by the scan engine 2105, can be based on a particular scan script 272 received from the scan controller 255 and be in the computing language(s) in which the data is to be generated and sent within the scan. Further, data returned from a target can be interpreted using one or more language interpreters of the scan engine 215 to generate scan result data describing the responses of the target and other results of the scan.

A scan controller 255 can further interface with scan engines (e.g., 215) to obtain scan result data returned from scan tasks performed by the scan engines. Further, a scan controller 255, in some implementations, can organize and aggregate scan result data (e.g., 274) in accordance with particular goals of the scan (e.g., measuring compliance with a particular security policy upon which the scan(s) is based, checking for a particular vulnerability, etc.). Further, a scan controller 255 can process scan result data to determine that desired information has been obtained from the scan or to determine that a particular type of scan was unsuccessful in obtaining particular information desired for a particular scan or set of scans, such as information for determining compliance with a particular security policy upon which the scans are based, among other examples. In such instances, a scan controller 255 can adapt a scan by cancelling a scan prematurely, replacing a scan script with another scan script, sending supplemental scan scripts to a scan engine, invoking another scan on another scan engine, among other examples to control the progress of the scan, among other examples.

In addition to adapting scans based on scan results obtained from previous or ongoing scans, scan controllers 255 can also identify particular scan engines adapted to perform particular scans. For instance, some scan engines may be particularly adapted to perform particular scans. For example, a scan engine can be specialized in its ability to scan and communicate with particular devices, services, and applications within the network 225. In other instances, some scan engines available on the network can be capable of performing a variety of different scans. Scan engines can include both host-based scan engines locally hosted on target devices (e.g., via an agent installed on the target device) or network-based scan engines remote from the target device, capable of externally probing a target device over the network 225. In the case of network-based scan, a scan controller 255 may additionally determine whether a particular network-based scan engine (e.g., 215) is capable of communicating with and thereby scanning a particular remote scan target (e.g., computing devices 228, 230, 235, 240). Such a determination could include determining whether the particular scan engine is on the same network as the scan target or is otherwise able to interface with the remote scan target. For instance, in some implementations, a scan controller 255 can identify from a mapping of scan targets to scan engines (i.e., identifying which scan controllers are capable of communicating with which scan targets) that a particular network-based scan engine is adapted to communicate with the scan target. If the scan controller 255 further determines that the mapped scan engine is able to perform a particular desired scan on the scan target, the scan controller 255 can forward the scan engine (e.g., 215) a scan script (e.g., 272) for use by the scan engine in scanning the scan target (e.g., computing device 240) over one or more networks (e.g., 225).

In some instances, a mapping of scan engines to scan targets can be maintained in connection with an asset repository 270 cataloguing system assets within the computing environment. System assets can include networks, applications and other programs, individual devices or subsystems within the computing environment, particular users or persons identified as using the computing environment, etc. The asset repository 270 can further catalogue identified attributes of the various system assets, for instance, to assist in identifying vulnerabilities of the system entities. Information included in the asset repository 270 can also be accessed by scan controller 255 to inform how to perform particular scans on particular scan targets (i.e., system assets to be scanned), which scan targets to scan, which scan engines to invoke to scan particular scan targets, attributes of the scan target to consider, etc. Additionally, scanning of particular system assets can result in the discovery of additional information and attributes of the system asset. Such information can be added to or replace other information for respective system assets documented in the asset repository, for instance, by an asset repository manager 265 operating in communication with a scan controller 255, among other example implementations. In some implementations, an asset repository manager 255 can include functionality for building, updating, and otherwise maintaining an asset repository 270 including records describing system assets discovered within the computing environment.

A detection interface module 260 can further be provided on asset management system that can allow the asset management system 205 to interface with asset detection engines 220 deployed within the computing environment and obtain results from the asset detection engines identifying host devices discovered on the network 225 or elsewhere in the computing environment, as well as attributes detected for the detected devices, such as address data and other information. Asset detection engines (e.g., 220) deployed throughout a network (e.g., 225) can identify data indicating the immediate presence of a particular device (e.g., 228, 230, 235, 240) on the network 225. An asset detection engine 220 can push alerts, notifications, or other messages to asset management system 205 to indicate that a particular detected computing device may be available for scanning (e.g., using scan engine 215).

In some implementations, in addition to scan controller 255, detection interface module 260, and asset repository manager 265, example asset management systems 205 can further include a policy administrator 268 that can be used to define and apply security policies to system assets identified and catalogued in asset repository 270. A library of security policies 275 can be maintained and accessed using policy administrator 268. In some implementations, security policies 275 can include standard security policies (e.g., generally applicable across computing environments), as well as environment-specific security policies. Indeed, in some examples, policy administrator 268 can include functionality allowing administrator users to define and generate new, customized security policies for their respective computing environments. Further, a policy administrator 268 can associate, either from user-entered associations or automated associations (e.g., rule-based policy assignments based on attributes of a respective system asset recorded in asset repository 270) which policies 275 apply to which system entities. Such associations can also be considered by scan controller 255 to identify the portion of the computing environment (e.g., particular scan target devices, a particular sub-network, etc.) to be scanned in a scan or scan set corresponding to enforcement or auditing of a particular policy 275, identify particular scans for particular identified scan targets, among other examples.

Information gleaned from scans (e.g., by scan engines 215, as well as asset detection engines 220 controlled by asset management system 205) can be used to enforce particular security policies against particular system assets. For instance, policy administrator 270 and/or asset repository manager 265 can be used to interface with a variety of security tools (e.g., 244, 245) deployed within the computing environment. Security tools 245 can be deployed remote from system assets (e.g., 228, 230, 235, 240) allowing for policy enforcement to take place remote from and behalf of the target (i.e., target of a security enforcement action by one or more of security tools 245), allowing security enforcement without the policy (or enforcement tool) being pushed to the target itself. This can be useful, for instance, in the security enforcement of mobile devices that move on and off of a monitored network, as well as unmanaged devices, such as devices not including agents or other local security tools capable enforcing important security policies (such as agent 244 on computing device 230). Such network-based security tools 245 can include, for example, firewalls, web gateways, mail gateways, host intrusion protection (HIP) tools, network intrusion protection (NIP) tools, anti-malware tools, data loss prevention (DLP) tools, system vulnerability managers, system policy compliance managers, asset criticality tools, intrusion detection systems (IDS), intrusion protection systems (IPS), and/or a security information management (SIM) tool, among other examples. Nonetheless, local security enforcement is also possible, for instance, through agents (e.g., 244) or other tools running, loaded, or otherwise interfacing directly with a target device (e.g., 230) and providing asset management system 205 with an interface for enforcing policy directly at the target device, among other examples.

Scan engines (e.g., 215) can be deployed on hosts devices (e.g., 210) within a network 225. Scan engines can be embodied in software and/or hardware and include at least one processor and one memory device. Scan engines can include functionality for performing one or more scan tasks, including scan tasks making use of one or more different computing languages. A scan engine can scan devices according to a particular computing language to elicit a response to a particular service, application, or device making use of that computing language. The scan task and scan language used by a scan engine in a particular scan or set of scans can be based on scan scripts and other instructions received from an asset management system in a scan request. Further, as noted above, scan engines can include network-based scan engine and host-based scan engines. A network-based scan engine, for instance, can execute a scan script that causes the scan engine 210 to imitate another device, service, or user on the network 225 (including malicious devices, services, and users) to test how a scan target reacts to interactions with the imitated device, service, or user, among other examples. The scan engine can additionally capture the responses, gain access to the target device and attempt to obtain data stored on the target, and perform other actions through its interactions (i.e., scan) of the device. Attributes and information discovered from the scan can then be reported to the asset management system 205.

Each host device in a computing environment can have fundamental characteristics that are atomic to it. For instance, characteristics, or attributes, can include an IP address (or IP addresses), corresponding media access control (MAC) address(es), fully qualified domain name (FQDN), operating system(s), etc. Knowing such characteristics can be used in risk analysis and security enforcement within the computing environment, for instance in the identification and communication with the device in connection with a scan and the reconciling of results of a scan of the device with results of previous scans of the device. Detecting devices in the network 225 and identifying attributes, including address information of the device, can involve a variety of techniques. For instance, agents can be deployed on the devices in the network to harvest entity attributes directly from the system entities. While accurate and convenient, not all host device may be "managed," in that they have or able to have an agent (e.g., 244).

When a device joins a network, security processes protecting and governing the network should become aware of its presence as immediately as possible. In a managed environment, this is fairly easy to accommodate since agents (e.g., 244) on devices can notify the asset management system 205 directly. However, in the case of unmanaged assets, detection of the device within the environment can be facilitated through network-based detection processes available to and in communication with asset management system 205.

An asset detection engine (e.g., 220) can include functionality that allows the existence or presence of devices on the network to be ascertained. Examples of such tools are ping sweepers, dynamic host configuration protocol (DHCP) monitors, address resolution protocol (ARP) cache farmers, etc. These tools can include active or passive tools, or sensors, that either actively or passively monitor the environment searching for new assets. Once a new asset is identified, the tool can notify the asset management system 205 permitting further asset attribute identification processes to begin (or continue). An example asset detection engine 220 can be a network-attached device or software system deployed to automatically detect live network devices on networks 225 of the computing environment using one or more of a plurality of detection techniques, and thereafter communicate the detection of devices to trigger additional activities (e.g., using asset management system 205), including attempting to scan the detected devices using one or more scan engines (e.g., 210). An asset detection engine 220 can include at least one processor 280 and one or more memory elements 282. In some implementations, an asset detection engine 220 can include a sensor framework 285 including one or more detection sensors including active and/or passive sensor enabling various active and passive detection techniques. The asset detection engine can use a sensor of sensor framework 285 to perform a particular type of detection task and detect devices in the computing environment.

In some instances, one or more asset detection engines (e.g., 210) can possess functionality that passively monitors a network 225 for various activities which includes the communication or identification of one or more device addresses. The identified addresses can then be extracted from the monitored information to identify a corresponding device in the network 225. This can be accomplished, for instance, by comparing (e.g., at asset detection engine 220 or asset management system 205) a detected address with a mapping of addresses to devices in the network (e.g., asset repository 270). Further, address information can be further used to ping, probe, and otherwise scan or communicate with the detected device at the identified address (e.g., using asset management system 205 and/or scan engine 215).

In some implementations, an example asset detection engine 210 can be deployed within a network to perform multiple different detection tasks associated with the detection of devices and addresses of devices within the network. In some implementations, an example asset detection engine 220 can be deployed, at least in part, as a hardware device that plugs into the network in-line (e.g., at a switch or router), in parallel (e.g., off a router span port), or, at least in part, as software that can be deployed throughout a subnet, such as on particular or arbitrary hosts within the network, on specialized hosts such as a network DHCP server, or in other deployments. The asset detection engine 220 can, in some cases, include a plurality of sensors on sensor framework 285, including pluggable sensor components, that can be configured to allow a single asset detection deployment (e.g., 220) to perform multiple different detection functions.

In some implementations, the sensor framework 285 can provide for combinations of both active sensors and passive sensors. Active sensors can include sensors that involve directly sending traffic to devices and addresses in the network and testing responses to the traffic. Such active sensors can include hardware- and/or software-based sensor components with functionality adapted to perform multicast queries, ping-sweeps, address sweeps, and other detection activities. Passive sensors, on the other hand, can include sensor components with functionality that attempt to obtain address information for and identify devices within the network outside of communications with the devices or corresponding to the addresses themselves. Passive sensors can include passive detection type sensors, event-based detection type sensors, and indirect detection type sensors. Sensor framework 285 can include active sensors and passive sensors of one or more types. Indeed, in some implementations, multiple sensors of the same type can be provided on a single sensor framework 285.

In some instances, active sensors can include sensors adapted to discover devices within a network utilizing IP multicasting. Multicast addressing, in the context of IP networks, is a technique for one-to-many communications where the sending of a message to a group of destination systems simultaneously results in routers creating copies of those packets for optimal distribution. Example multicast queries for detecting (or newly discovering) devices on the network 225 can include queries utilizing a link-local scope all-nodes multicast address (e.g., "FF02::1" prefix). For instance, an example active sensor can send a DHCPv6 UDP probe to port 547 at the multicast address FF02:0:0:0:0:0:1:2 to discover all DHCP servers and relay agents. In another example, an example active sensor can send an ICMP query to the "all nodes" multicast address FF02::1 to discover systems on the local network. In still another example, an example active sensor can send an ICMP query to the "all routers" multicast address FF02::2 to discover routers on the network, among other examples.

In other examples, one or more active sensors included in sensor framework 285 can include sensors adapted to perform targeted pinging, brute force address, or ping, sweeping to discover devices on a network. For instance, an active detection sensor can attempt to detect whether a particular device corresponding to a particular address is currently present on network 225 by pinging the address. Pinging and ping-sweeping can utilize traditional ICMP ping-sweeping techniques, whereby one or more packets are sent to a potentially live address, among other techniques. If a response of a particular type is received, then the target address is considered present and live. Ping sweeping can include ICMP ping sweeping (for several packet types), sweeping for open sockets against known TCP ports, sweeping for half-open sockets against known TCP ports, and sending "nudge" packets to specific, known UDP ports, among other examples.

Further, while address sweeping can be applied to target-based address sweep detection (e.g., targeting specific, known IP addresses or IP address range previously identified or selected based on passive detection tasks of one or more asset detection engines 210), active detection sensors can also continuously sweep address ranges to both detect known devices, discover newly active addresses (e.g., indicating that the device in on the network 22%), and to verify that previously active addresses are still active or have become inactive, firing off events to asset management system 205 or directly to scan engines (e.g., 215) to perform scans and other useful work in near real-time when state changes are detected.

Passive sensors on sensor framework 285 can also discover newly active and detected devices on a network 225. Passive sensors can include latent detection sensors, event-based detection sensors, and indirect detection sensors. Latent detection sensors can include sensors adapted to latently monitor the network for various activities which include the communication or identification of device address information and extract the address information without direct contact with the host systems (i.e., corresponding to the address). Latent detection sensors can include sensors adapted, for example, to monitor NetBIOS broadcast packets, monitor internet control message protocol (ICMP) traffic, sniffing general network traffic, sniffing traffic via switch port mirroring (such as through a switch port analyzer (or "SPAN port")), among other examples. For instance, a latent detection sensor adapted to intercept NetBIOS broadcast packets can determine address information, among other system entity attributes, of devices on a network. Many systems, including those based, for example, on Microsoft's Windows™ operating systems, can broadcast datagram packets to their local network, for instance, in connection with NetBIOS datagram distribution service for connectionless communication on UDP port 138, among other examples. NetBIOS datagram broadcast packets can identify the IP address and MAC address of the sending device from which the intercepted NetBIOS packets originate and can further include data that, when processed, reveals the sending device's operating system among other information. Accordingly, a latent detection sensor adapted to intercept NetBIOS broadcast packets can identify sending devices, their respective address data, and operating systems of the sending devices.

In another example, another (or the same) latent detection sensor can be adapted to monitor ICMP traffic. Significant amounts of traffic can be generated and sent by devices within a network via the ICMP protocol. Properly adapted latent detection sensors can listen for particular types of multicast ICMP traffic, such as neighbor solicitation packets and neighbor advertisement packets, to identify the addresses (i.e., MAC address and IP addresses) of one or more devices identified in the traffic, among other examples. In still another example, a latent detection sensor can be adapted to sniff general network traffic for address information that can be used to identify previously unknown devices in the network, or addresses previously unknown as used by previously identified devices in the network. IP packets include source and destination address information, as well as source and destination ports and the respective MAC addresses of the source and destination. Accordingly, sniffing all network traffic can allow the discovery of new address data, and thereby also, new devices communicating over the monitored network. By passively sniffing all network traffic, new device addresses can be discovered whenever such devices communicate over the network. Sniffing general traffic can be problematic in some networks, however, as many contemporary networks are "switched," whereby network devices, and perhaps also the deployed asset detection engine 220, only receive broadcast packets, multicast packets, and packets directly addressed to the device hosting the asset detection engine. In other instances, port mirroring can be leveraged to identify previously known device addresses within a network. Some network routers and switches can be configured to forward or "mirror" all traffic on specific device ports, or even entire virtual local area networks (VLAN's), to another port on the switch, such as the Switched Port Analyzer (SPAN) on Cisco devices and Roving Analysis Port (RAP) on 3Com switches, among other examples. Some implementations of a latent detection sensor useable in a sensor framework 275 can be adapted to sniff traffic on a configured SPAN port (or other traffic-mirroring port) of a network switch, thereby allowing the sensor to monitor all network traffic mirrored over the port including traffic directed at other devices in a switched network, without requiring the sensor to be physically connected to the mirroring port.

Passive sensors can also include event-based detection sensors. Generally, event-based detection sensors can register or otherwise interface with a network service to receive notification when one or more particular pre-identified types of event occur. The reporting or detection of such events (to or by the respective network service) can include the identification of device addressing information of interest to the asset management system 205, such as IP addresses and DNS names. Such events can include, for instance, DHCP server events, Microsoft Active Directory™ audit events, and firewall and intrusion prevention system (IPS) events, among other examples. Event-based detection sensors can interface with the respective devices and systems recording such events and identify those particular events and event records that can be mined for address data for use in building or supplementing records of the asset repository 250.

As an example, one implementation of an event-based detection sensor can include a sensor adapted to interface with one or more DHCP servers in a DHCP network environment. In a DHCP network environment, each time a system is turned on and joins the network it broadcasts a request to receive an IP address from the nearest DHCP server. The nearest server then generally allocates an address lease and informs the target (requesting) system what its address should be. Further, once the system's lease expires, it is removed from the DHCP server's list of active addresses. In some implementations, DHCP servers monitor and/or participate in this address leasing process, and an event-based detection sensor can include functionality for interfacing with the DHCP server(s) and query records of the DHCP server, receive alerts and other messages from the DHCP server, or otherwise acquire information from the DHCP server regarding recent lease events involving devices in the network. For instance, some implementations of DHCP servers provide APIs to other devices and services (such as Microsoft DHCP Server's "DHCP Server Callout API") and log files (such as the Unix/Linux DHCP Server "dhcpd" logging leasing events), among other examples and implementations. Generally, information obtained by the sensor from a DHCP server can be used, in turn, to identify potentially new or previously unknown devices in the network.

In another example, an example event-based detection sensor can be adapted to interface with a Microsoft Windows Active Directory server to obtain records of particular types of events recorded or identified by an Active Directory server. For instance, in an organization, when a user performs a login or logout of a system joined to an Active Directory domain, events can be created in the event log of the Active Directory server. Some particular events, and the logging of these events, can include the identification of IP address and DNS name information of one or more devices in the network. The event-based detection sensor can extract this address data for use by the asset management system 205.

Additionally, event-based detection sensors can also interface with firewalls, IPSs, and other security tools (e.g., 245) to obtain log and other information describing events identified and monitored by the tools 245. For instance, firewalls are devices which allow or deny network transmissions, based on a set of user specified rules. Intrusion Prevention Systems (IPSs) are devices which do a deep packet inspection and generate events when specific traffic patterns are noted. IPSs can also modify or prevent such traffic. Both firewalls and IPSs can serve to notify network administrators in the event of a network attack, or help to actually prevent break-ins, the spread of viruses, worms, etc. In some implementations, an IPS or firewall can be additionally configured to generate an event relating to particular types or patterns of network traffic and generated events can include the creation of a record or message listing source and destination addresses, DNS names, and open ports involved in the traffic monitored in connection with the event. Further, firewalls and IPSs can be configured to interface with an event-based detection sensor and report, as events, the detection of particular types of packets including address information, such as DHCP address requests, DNS name queries, among other examples.

Indirect detection type sensors can also be included among passive sensors on example asset detection engines 220. Indirect detection type sensors can be adapted to interface with and query various network services that record and maintain device address information to extract those addresses without direct contact with the corresponding hosts. Such target network services and devices can include, for example, simple network management protocol (SNMP) servers (e.g., SNMP management information base 2 (MIB2)), hosts' neighbor databases (e.g., via a netstat command), DHCP databases, and router-maintained neighbor information databases, among other examples.

In one particular example, an indirect detection type sensor can be adapted to query a management information base (MIB) of an SNMP server (including MIB2). From a MIB2, a wealth of information can be obtained that can be used to further build up an asset repository 270. For instance, a MIB21 can be queried to obtain the SNMP server's ARP table and thereby also a listing of devices that the SNMP server/device has been in contact with over the local network, including the address information of the devices. A connection table can be obtained listing systems, their IP addresses, and ports that the SNMP server/device is connected to or has sent or received data. A route table can also be accessed together with details of how packets are routed from the device to others on the network, including IP addresses of other devices involved in the routing. Additional example data can also be obtained from SNMP devices and other SNMP queries can also reveal address information and other useful data of devices in the network within which the SNMP device communicates.

In another example, an indirect detection sensor can be adapted to obtain a command shell on a remote device in the network and issue a netstat command to obtain a list of systems in the network, by IP address, with which the remote device has connected to or exchanged data together with port information of the other systems. Other indirect detection sensors can be adapted to interface with DHCP servers and query databases kept by one or more DHCP servers to obtain address information of devices on the network. For instance, an indirect detection sensor can be adapted to identify DHCP systems on the network and use a remote API to query a DHCP server database (e.g., using DhcpEnumServers, DhcpEnumSubnets, DhcpEnumSubnetClientsV5, etc.) or access a DHCP lease list (e.g., flat text file least lists maintained in Linux systems) using, for instance, a remote command shell, among other examples. Additionally, some indirect detection sensors can also query routers for device address information, for instance, by querying an "ipv6 neighbors information database" of various routers within the network. Such a database can maintain listings of IP addresses and MAC addresses known to the respective router (e.g., of all devices which have generated network traffic since the router was last initialized), which can be harvested using a corresponding indirect detection sensor. In some instances, such a sensor can be adapted to maintain and utilize specific connectors for each individual router or network device to be supported, as well as, in some instances, records of router credentials, type, and address.

Regardless of the type of asset detection technique used, asset detection engines (e.g., 220) can identify that particular devices have participated in communications, event, and transactions within networks of the computing environment. Detection of evidence of a device's presence on the network can be used as a basis for triggering a scan of the particular detected device(s). Further, in some instances, additional detection activities can be performed in response to identifying evidence of a device's presence on the network. For instance, prior to requesting a scan and dedicating resources of a scan engine host to a scan of a detected device, in some instances, asset management system 205 can request asset detection engines to prompt further tasks to confirm the presence of the detected device, such as an active detection ping of the device at an address detected in a previous detection activity. In other instances, rather than risk missing a window to scan a detected device while waiting for additional detection activities to be performed to confirm the presence of the detected device, an identified scan for the detected device can be immediately triggered by the asset management system 205 upon being notified of the detection of the target device.

In some instances, asset management system 205 can attempt to opportunistically scan particular devices within a computing environment. Asset detection engines 220 can return data identifying unmanageably large numbers of instances of device detections within a computing environment including, potentially hundreds or thousands of distinct devices. In some implementations, rather than initiating scans for every detected device or every time a device is detected by one or more asset detection engine 220, a limited subset of devices can be identified by asset management system 205 for which detection of the device (e.g., using one or more asset detection engines) would prompt a scan of the device in response. For instance, a listing of devices can be maintained of devices that were not scanned in a recent particular scan. When the unscanned devices are detected, asset management system 205 can determine that the detected device corresponds to one of the unscanned devices and trigger the corresponding scanning of the device by an appropriate scan engine. In still other examples, only a particular subset of scans (e.g., of particular importance) can include the maintenance of listings (by asset management system 205) of unscanned devices. In other examples, devices of particular importance within a system, devices identified as mobile devices (i.e., devices that are more likely to periodically be off-network), and devices identified as having a history of sporadic presence on networks of the computing environment (e.g., a mobile computing device of a particular user, such as an executive, salesperson, telecommuting employee often traveling or otherwise away from the office) can be included in a listing of devices for which opportunistic scanning should be attempted in response to detecting the device within the network, among other examples.

Figure 3:
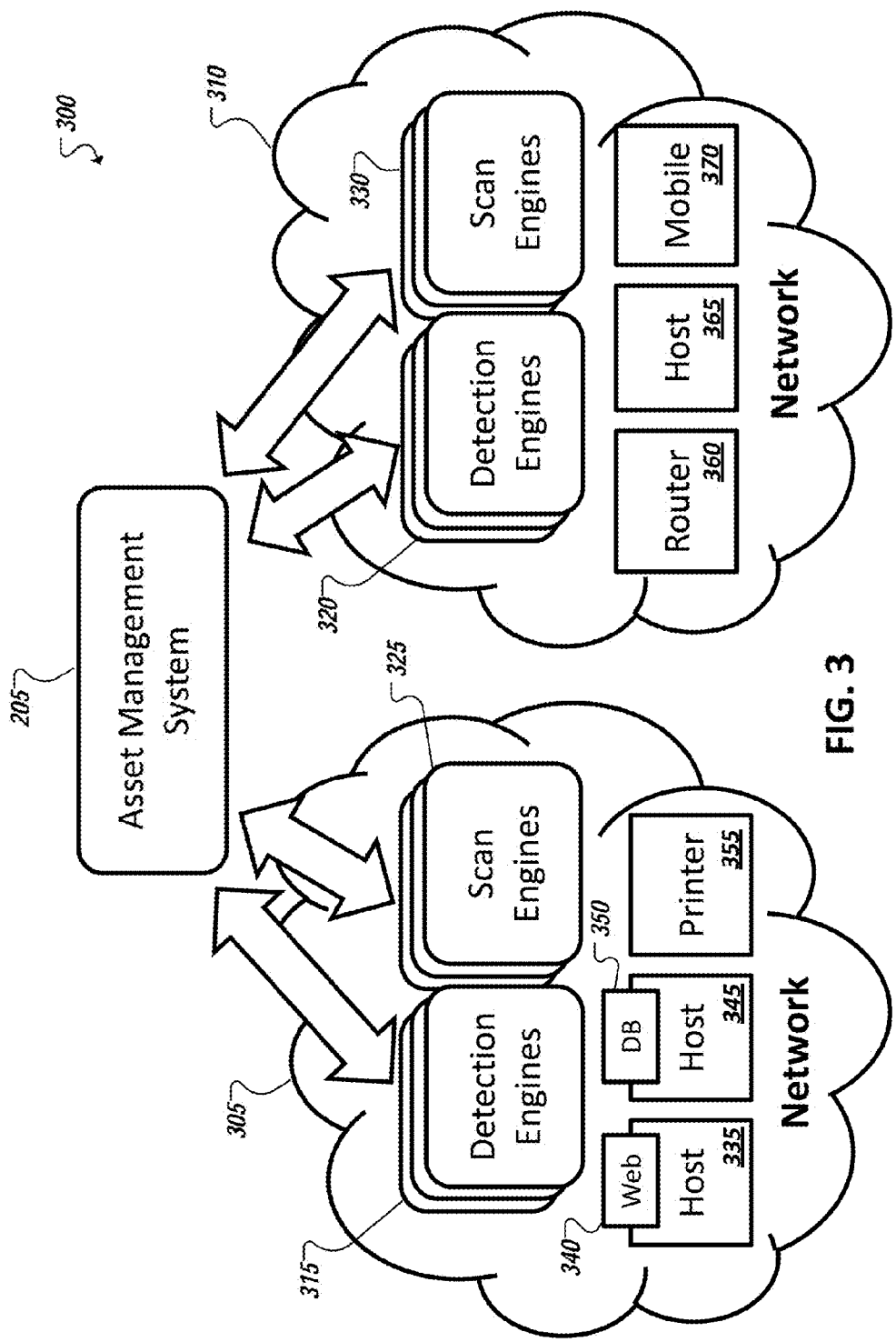
FIG. 3 is a simplified block diagram illustrating deployment of asset detection engines and scan engines in two or more networks of an example computing environment in accordance with at least one embodiment.

Turning to FIG. 3, as shown in the simplified block diagram 300, in some examples, a computing environment can include multiple networks and sub-networks (e.g., 305, 310) managed by an asset management system 205. Each network 305, 310 can have one or more asset detection engines 315, 320, but also one or more scan engines 325, 330 adapted to perform tasks on discovered devices, such as particularized, post-detection scans to determine the operating system, hardware, ports, applications, vulnerabilities, users, and other information that can be used, for instance, in the identification of other system entities in the computing environment, including application-type entities and person-type entities. Such information can also be used in the assignment of security policies to particular networks, devices, applications, and persons within the computing environment.

As shown in the example of FIG. 3, each networks 305, 310 can include multiple asset detection engines (e.g., 315, 320). Further, as noted above and elsewhere herein, detection of a device and corresponding address information by an asset detection engine (e.g., using one or more sensors included on the asset detection engine) can be used by other services and devices, such as other asset detection engines and/or scan engines (e.g., 325, 330). Address information alone, in some instances however, can be insufficient to direct or trigger tasks by other asset detection engines or scan engines targeting a particular device. For instance, a single IP address can be repeated in each of sub-networks 305 and 310, despite the networks 305, 310 residing within the same computing environment, such as an enterprise software environment. Accordingly, an asset management system 205 may utilize additional information to identify the proper scan engine or asset detection engine included in the network corresponding to the particular instance of an address associated with a detected device.

As an illustrative example, in FIG. 3, host devices are provided in each of networks 305, 310. For instance, a host device 335 hosting a website 340, a host device 345 hosting a database 350, and a printer device 355, among others, can be included in network 305. Further, a router 360, host device 365, and mobile computing device 370 can be included in network 310 in this particular example. In this particular example, host 335 and host 365 can possess the same IP address. In order to identify and invoke the proper scan engine (e.g., one of scan engines 330) to probe host 365, asset management system 205 can maintain a mapping or other association of asset detection engines to scan engines. For instance, asset management system 205 can map an asset detection engine in asset detection engines 315 to a scan engine in scan engines 515 and an asset detection in asset detection engines 320 to a scan engine in scan engines 330, to thereby also identify the proper scan engines (or other asset detection engines) for hosts or other devices detected by a particular asset detection engine.

Continuing with the previous example from FIG. 3, asset detection engine 320 can identify the IP address of host 365 and report the discovered address information to asset management system 205 as having been detected. Asset management system 205, in this example, can elect to perform a scan of the device (e.g., host 365) corresponding to the detected IP address. To accomplish this, asset management system 205 can identify that the IP address for host 365 was returned from asset detection engine 320 and consult a mapping to identify one or more scan engines 330 located in the same network 310 as and adapted to perform the desired scan. Indeed, in some instances, an asset detection engine (e.g., in 320) itself can query or otherwise access the mapping to identify and directly invoke an associated scan engine (e.g., in 330).

A mapping of associated asset detection engines 315, 320 and scan engines 325, 330 can be built using a variety of techniques. For instance, asset detection engines can be manually and explicitly associated with scan engines (e.g., by a user administrator). In another example, asset detection engines and scan engines can be strictly associated (i.e., one asset detection engine to one scan engine, and vice versa) such as by deploying an asset detection engine in tandem with a scan engine, for instance, on the same host device. In still other examples, mapping can be automated. For instance, asset detection engines 315, 320 and scan engines 325, 330 can each be identified in and mapped to one or more particular networks 305, 310 and an asset management system 205 can identify that particular address information (e.g., corresponding to a particular device, e.g., 360, 365, 370) is collected from a particular asset detection engine (e.g., in 320) within a particular network (e.g., 310). In other instances, particular asset detection engines 315, 320 can be mapped directly to particular scan engines 325, 330. In some instances, a scan engine can find or identify an associated asset detection engine, while in other instances, an asset detection engine can find or identify an associated scan engine. In either instance, a scan engine and/or asset detection engine can report the discovery of an associated asset detection engine/scan engine so as to map the scan engine to the associated asset detection engine (and vice versa).

In some implementations, address information collected by asset detection engines 315, 320 can be used to associate asset detection engines 315, 320 and scan engines 325, 330

(and/or to identify that an asset detection engine is in the same network as one or more scan engines, etc.). For instance, if a particular asset detection engine (from 315) identifies address information known to the asset management system 205 to correspond to a particular device hosting one or more particular scan engines (e.g., 325), asset management system 205 can use the returned address information to confirm that a particular asset detection engine (e.g., 315) is on the same network (e.g., 305) with the corresponding, particular scan engine (e.g., 325) and that the particular scan engine would consider address information of scan targets as corresponding to the network (e.g., 305), rather than confuse the scan target with another on a different network (e.g., 310), among other examples. For instance, scan engines and/or detection engines can identify traffic or behavior that resembles that of an asset detection engine or scan engine and thereby identify that they are each in the same network, or that the particular scan engine 325 is otherwise able to reach a particular target device corresponding to address information discovered by an associated asset detection engine.

Figure 4A:
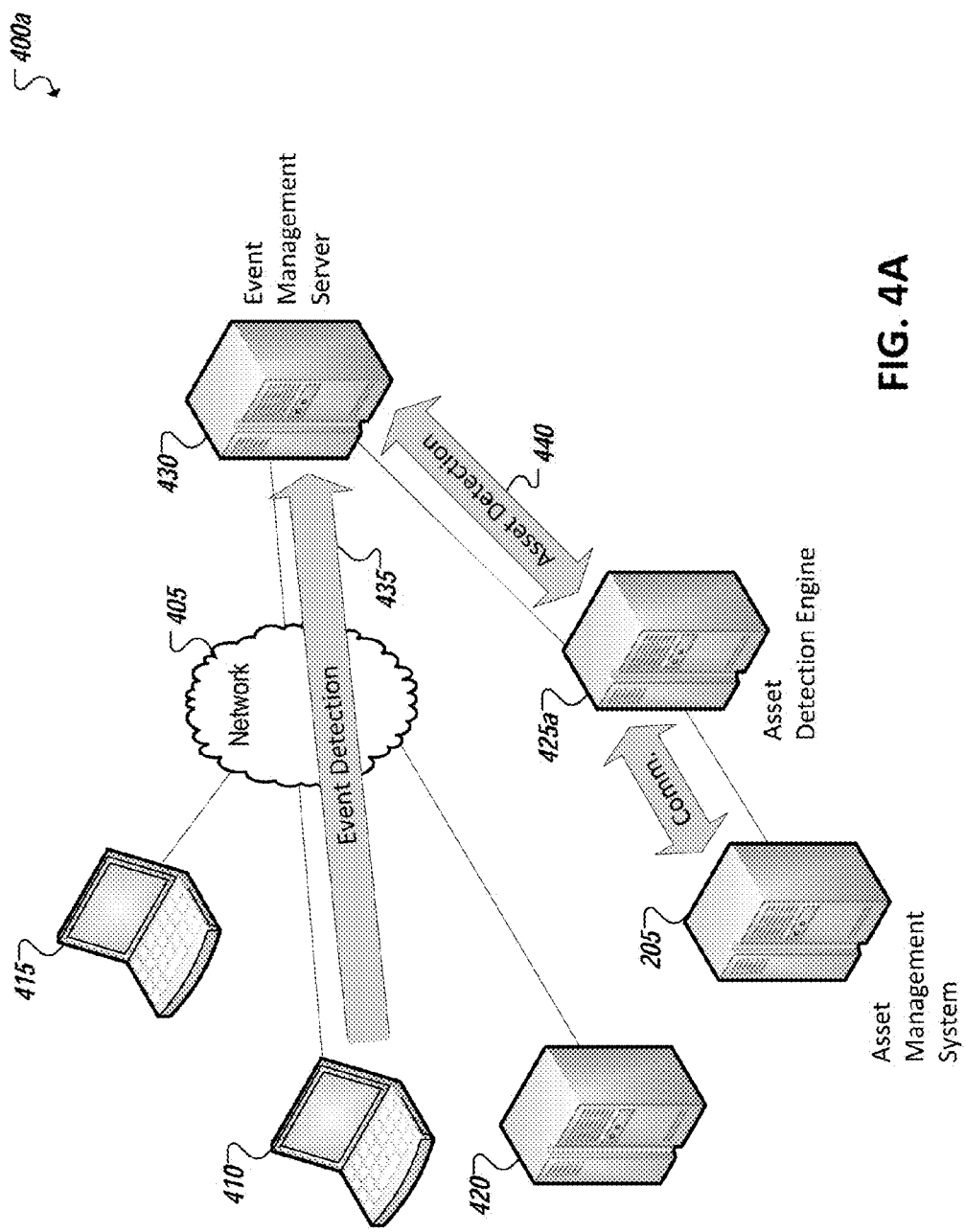
FIGS. 4A-4D are simplified block diagrams illustrating example operations of an example asset management system and example asset detection tools in accordance with at least one embodiment.

Turning to FIGS. 4A-4D, simplified block diagrams 400a-d are shown illustrating example detection operations utilizing one or more example asset detection engines (e.g., 425a-d). As shown in FIG. 4A, a plurality of host devices 410, 415, 420 are shown that are or have been on a particular network 405 and that can be detected using one or more various asset detections engines when the devices appear on the network 405. For instance, in the example of FIG. 4A, an event-based detection sensor on the asset detection engine 425a can be used to identify one or more devices on the network. For instance, an event involving device 410 can be identified on the network by one or more network services, such as an Active Directory server, IDS, firewall, or other tool or service (e.g., event management server 430). An event management server 430 can detect, register, and record events on the network including address identifiers of devices (e.g., 410) involved in the detected event. In some instances, an event-based detection sensor can be alerted of and/or forwarded event data for new events detected by an event management server 430. For instance, event management server 430 can forward particular events to an event-based detection sensor that have been previously identified as likely including address information of devices in the network. In other instances, an event-based detection sensor can interface with the event management server 430 and query event records of the event management server 430 to identify new event data and extract device address data from the event data. Such event data can then be processed by the asset detection engine 425a and sent to the asset management system 205. From the event data, it can be determined that device 410 is/was on the network 405.

Figure 4B:
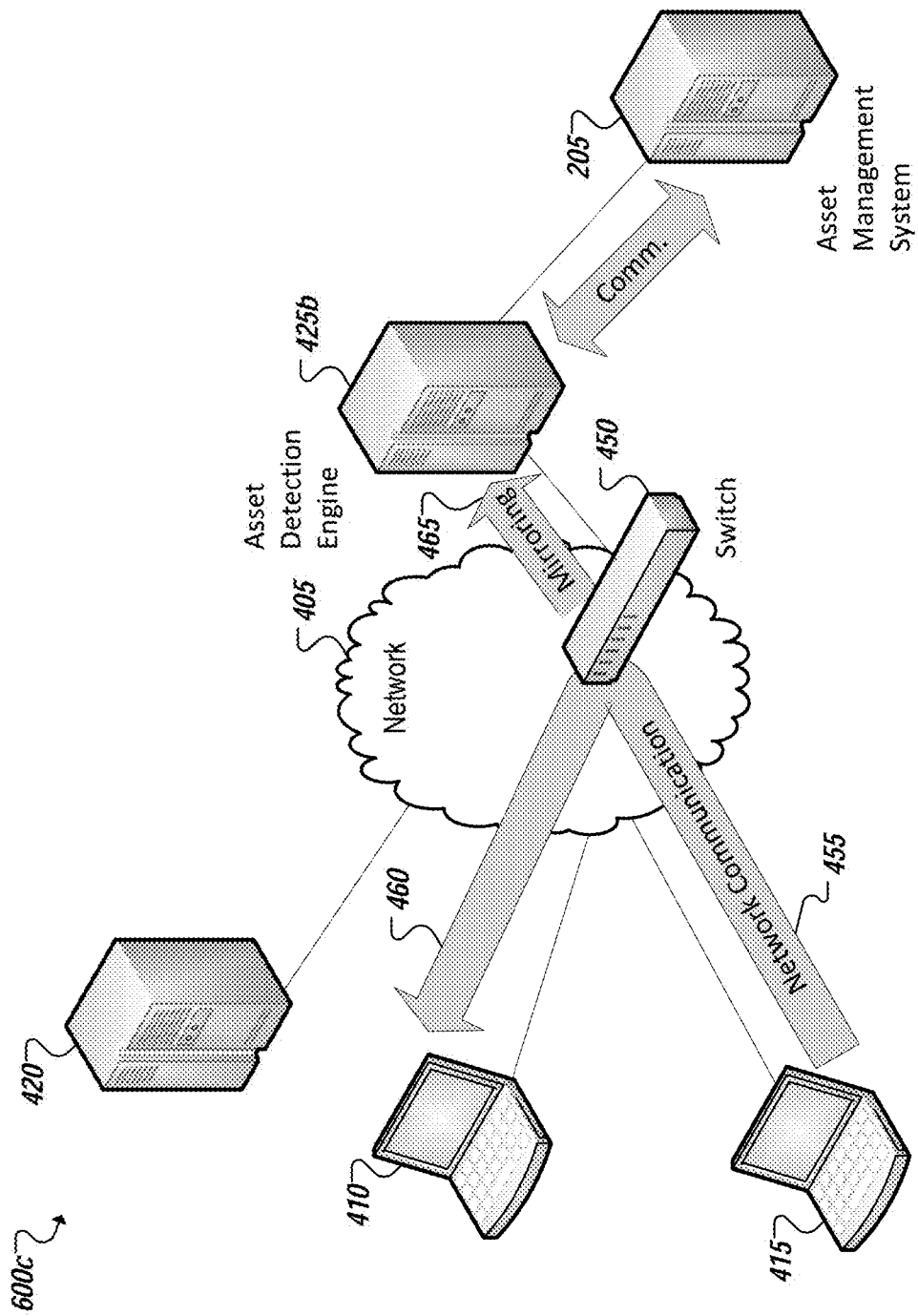

Turning to FIG. 4B, other asset detection engines, or other sensors of the same asset detection engine, can detect host device 410 using other passive detection techniques, such as latent detection techniques. For instance, asset detection engine 425b can include a SPAN port sensor, or other sensor, capable of listening to port mirroring at one or more switches, routers, or other network elements with a network 405. For instance, sensors of asset detection engine 425b can identify traffic across a switch 450 including the addresses of a source and destination of a particular network communication 455 through port mirroring (e.g., 465) on the switch 450. In this particular example, the destination IP address discovered by asset detection engine can correspond to host device 410. The IP addresses discovered by asset detection 425b using a sensor capturing port mirroring data (e.g., at a SPAN port of switch 450) can then be communicated to asset management system 205, as shown in FIG. 4B.

Figure 4C:
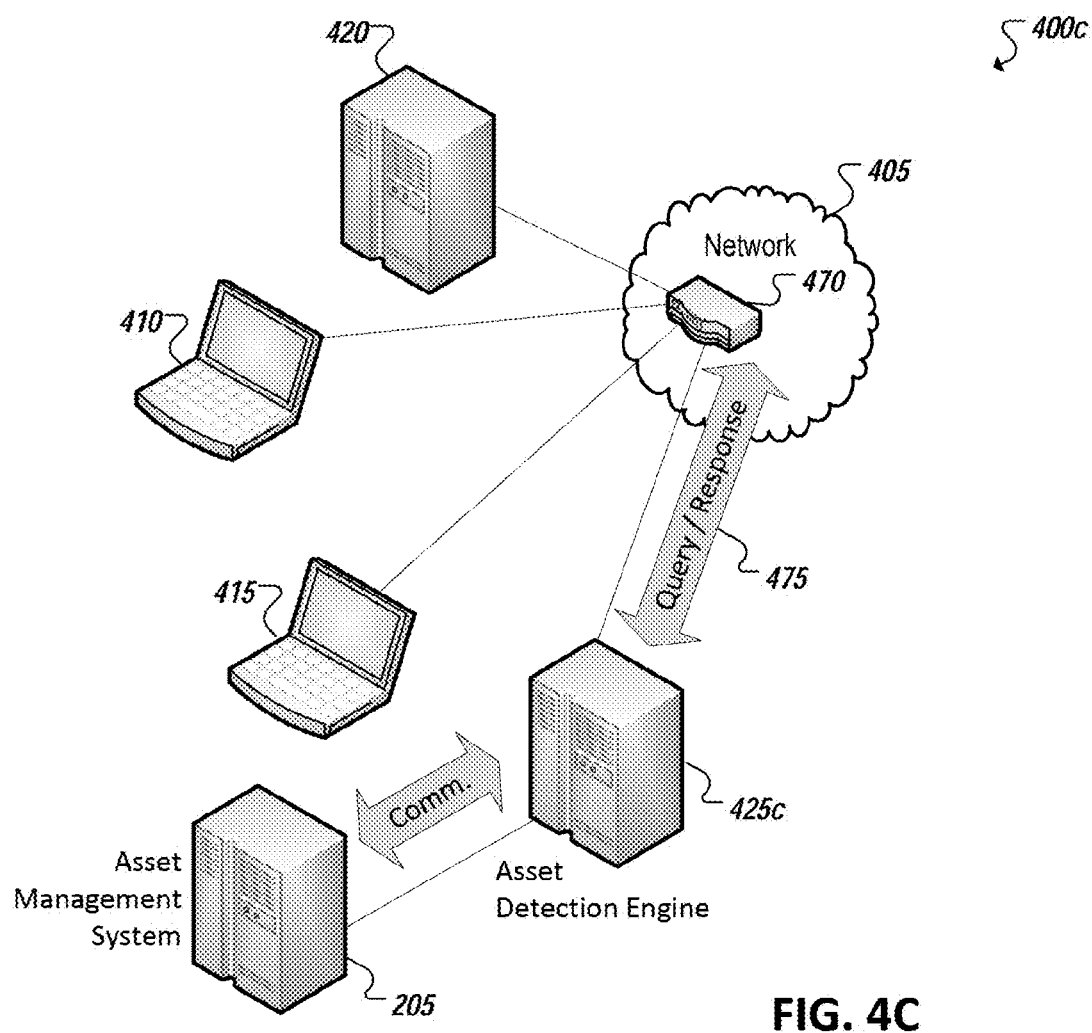

Turning to FIG. 4C, in other instances, an example asset detection engine 425c can be adapted to perform additional detection tasks, including using indirect detection techniques. As an example, as shown in FIG. 4C, an indirect-type sensor can query records of other network elements, services, and computing devices on a network (e.g., 405) to identify previously unidentified address information of known and unknown devices on the network 405. For instance, in the example of FIG. 4C, an indirect-type sensor can be employed to query data structures, such as databases, routing tables, etc. of a network device 470, such as a router table of a router 470, or other hosts of one or more network services, such as a DHCP server, intrusion detection system (IDS) system, or other server that, in the course of its operation, records address information of devices within the network 405. In response to the query, address information can be returned from the data structures for use in identifying that particular devices (e.g., 410, 415, 420) are or were on the network 405.

An indirect-type sensor can query a source network management server (e.g., or network element (e.g., 470) to obtain the entirety or a subset of the data structures containing the address information collected by the address data source (e.g., 470). For instance, in some examples, an unfiltered set of data can be returned to a sensor of the asset detection engine 425c in response to a query (e.g., at 475) and processed by the asset detection engine 425c and/or asset management system 205 to identify address information of interest to the asset management system 205 (e.g., the identification of new, different, or recent address information). In other instances, an indirect detection sensor of an asset detection engine 425c can perform a filtered query of a network address data source (e.g., 470), for instance, to return only a subset of data from the data source, such as the data most-recently collected by the data source, data collected during a particular period of time, etc.

Figure 4D:
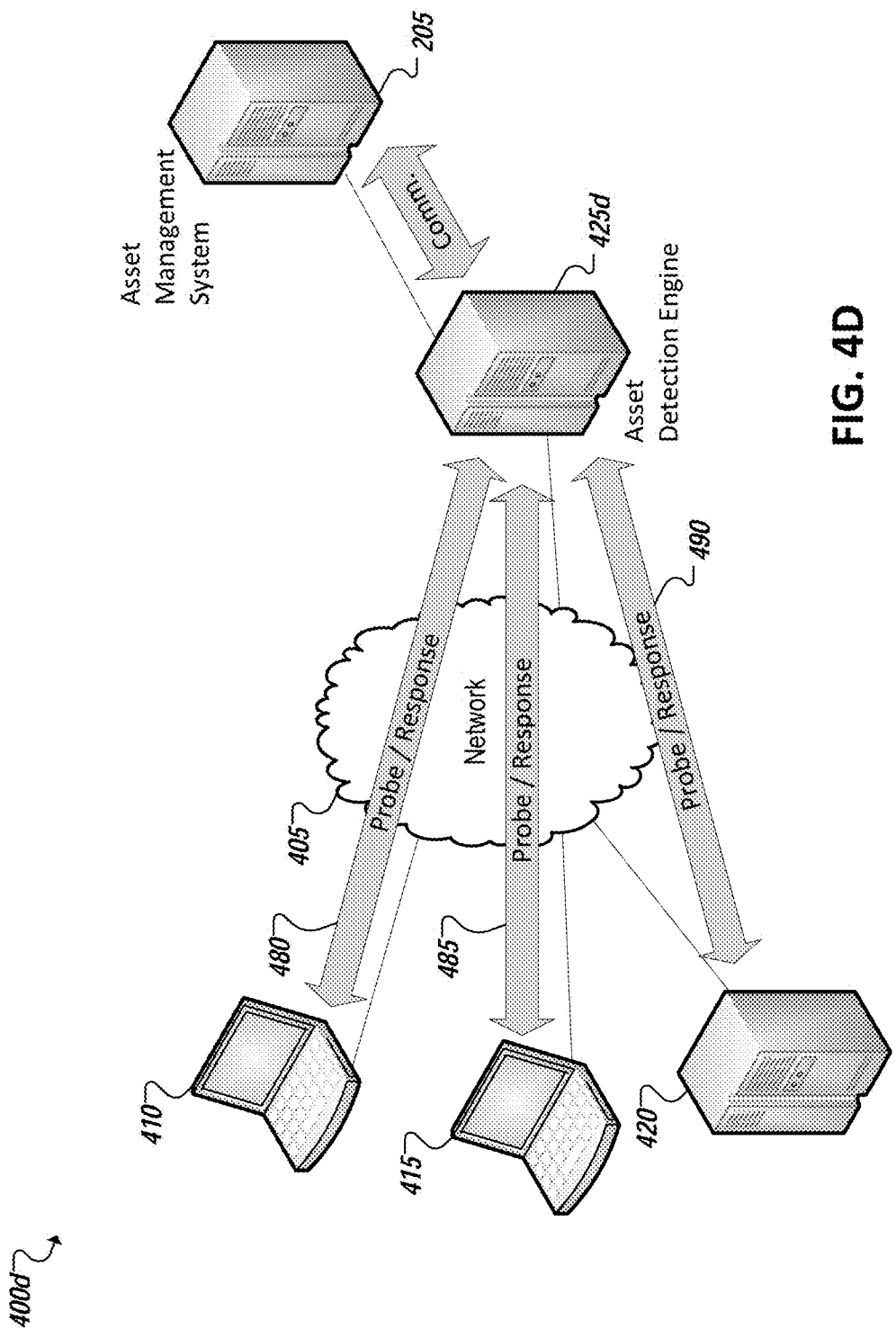

Turning to FIG. 4D, in addition to performing passive detection to detect computing devices on the network 405, in some instances, an asset detection engine 425d can utilize active detection sensors to perform active detection of devices (e.g., 410, 415, 420) on the network 405. In some implementations, an active detection sensor may not be able to perform its detection task without having a particular identification of a target device or range of targets (e.g., one or more target IP addresses). Asset management system 205 can identify particular target devices to an asset detection engine 425d and an active detection sensor of the asset detection engine 425d can probe and monitor responses (e.g., 480, 485, 490) of target devices and communicate the results, including indications of which devices were "live" (e.g., responded to a ping or other scan communications), or otherwise detected, to the asset management system 205.

Turning to the examples of FIGS. 5A-5E, simplified block diagrams 500a-e are shown illustrating example operations including an example asset management system 205 and a plurality of scan engines (e.g., scan engines 510, 515). For example, following the detection of a host device (e.g., 410) on the network 405, for instance, by an asset detection engine (e.g., 425) employing detection techniques similar to those described in connection with the examples of FIGS. 4A-4D), the asset detection engine can send a detection message 505 to an asset management system 205 for use by the asset management system 205 in connection with its management of security-, risk-, and policy-related scans within the computing environment. The detection message 505 can include an identification of address information of the detected device, the time at which the address information was detected, how the address was detected, the asset detection engine 425 that was used to detect the address information, the source of the address information, among other examples.

Based on the received detection message 505, asset management system 205 can determine whether to prompt a scan in response to the detected asset (e.g., 410). For instance, asset management system 205 can assess whether scanning of a particular detected host 410 is desired based on a variety of factors, such as the likelihood that the host is still on the network 405 (e.g., based on how long ago the detection occurred), whether scan engines exist or are available (e.g., not busy with other scans) to scan the particular host device, whether the identified host device is included in a listing of unscanned, critical, mobile, or other target devices, etc. Further, the asset management system 205 can further identify one or more scans that should be performed on a particular detected host device 410, as well as identify particular scan engines capable of performing the identified scans. Identifying capable scan engines can include identifying corresponding scan engines mapped to either or both of the detected host device 410 and the asset detection engine (e.g., 425) that detected the device. Identifying scan engines can further include identifying scan engines possessing the functionality to perform the identified scans as well as determining whether the scan engines presently have availability to perform the scans, among other examples.

Figure 5A:
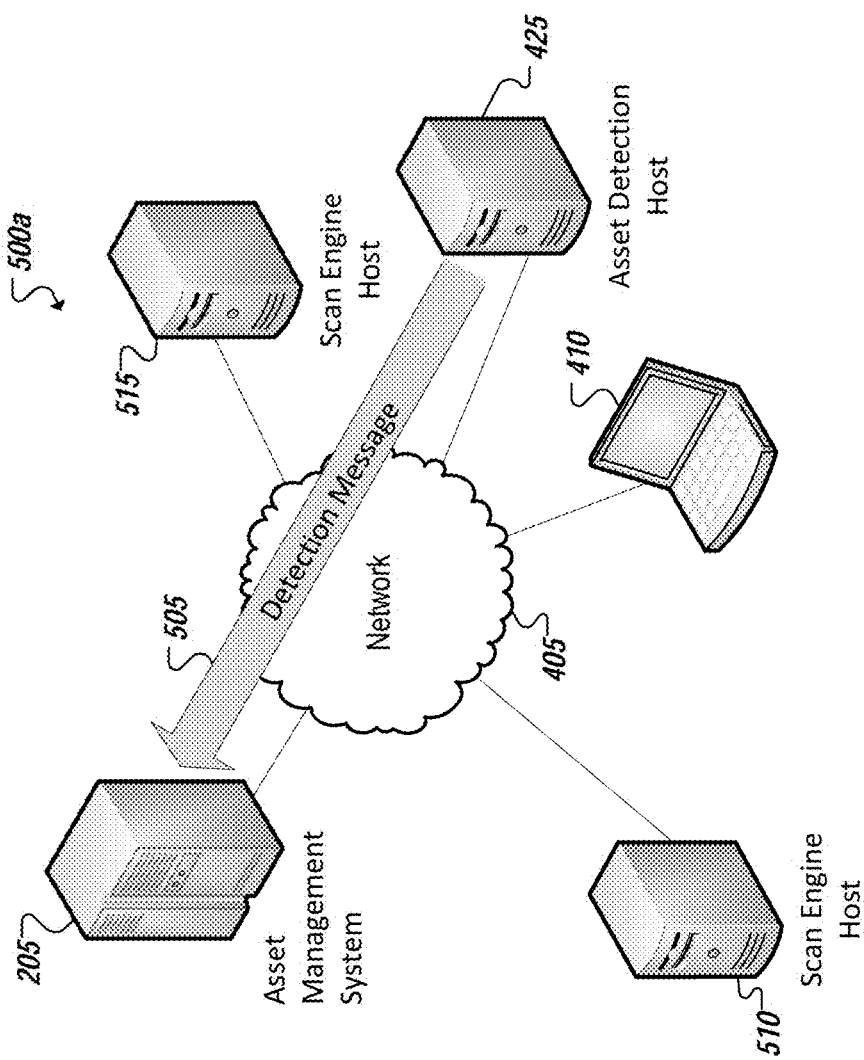
FIGS. 5A-5E are simplified block diagrams illustrating example operations of an example asset management system and example scan engines in accordance with at least one embodiment.
Figure 5B:
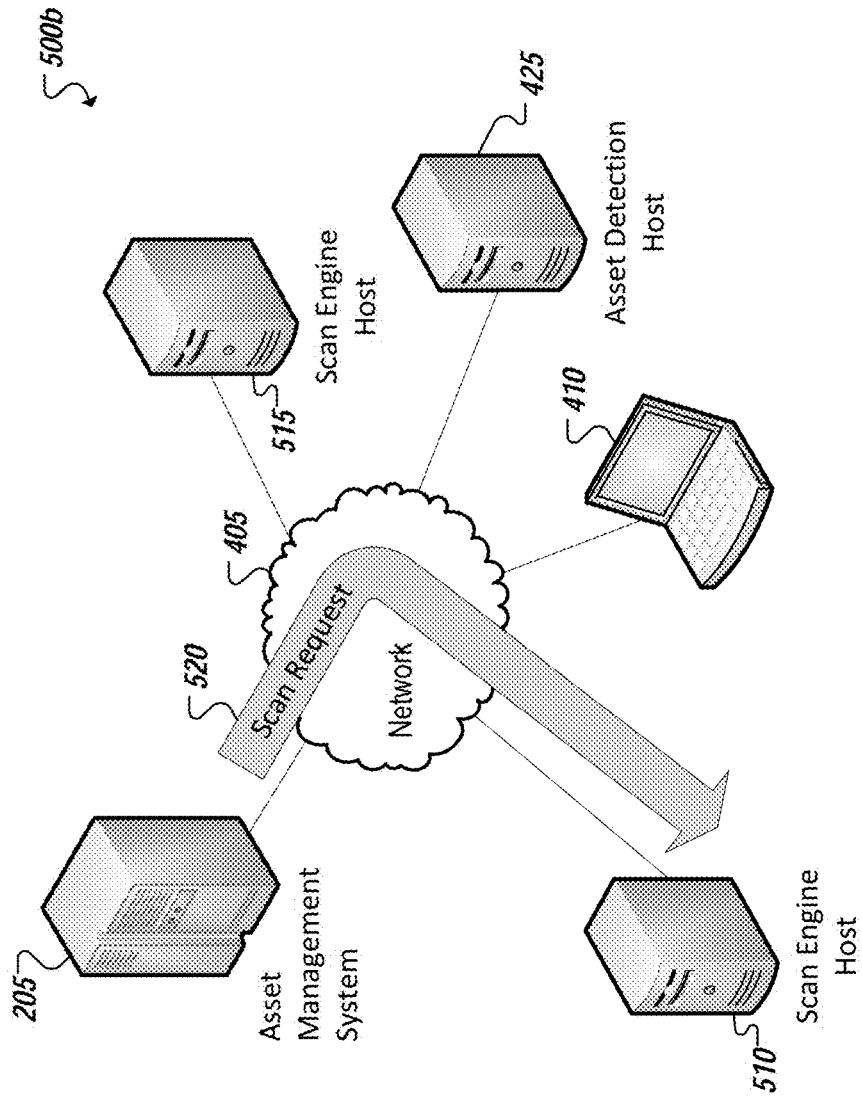
Figure 5C:
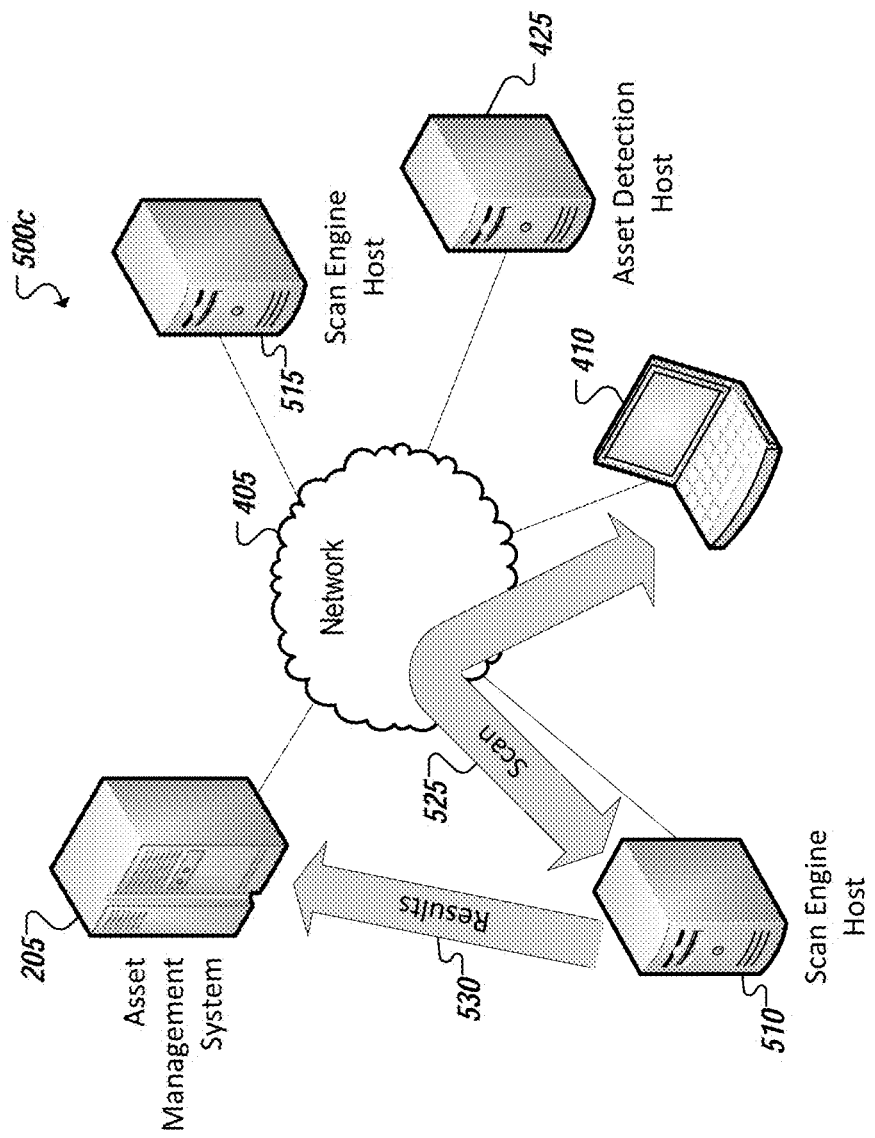

Turning to the example of FIG. 5B, upon determining whether to trigger a scan of host device 410 based on a detection of the host device by one or more asset detection engines, identifying one or more particular scans to perform in response to the detection, and identifying scan agents available to perform the scans, the asset management system 205 can trigger the identified scans by sending scan requests 520 to the identified scan agents (e.g., 510). The scan request 520 can include one or more scan scripts and other instructions directing the scanning activities of the scan engine (e.g., 510) during the requested scan. In some instances, the scan request 520 can request multiple scans of the detected host device 410 and/or multiple detected devices (e.g., device not illustrated in addition to host device 410), among other examples. Based on the scan request 520, as shown in FIG. 5C, the scan engine 510 can execute a scan script or perform scan tasks (e.g., 525) according to other instructions received in scan request 520 and attempt to perform the requested scan 525 of the detected device 410 and return results 530 of the scan to the asset management system. In some instances, the attempt to scan the detected device 410 will fail, for instance, because the host device is no longer on the network or because the scan engine is otherwise unable to complete the scan of the detected device. In such instances, scan results 530 can describe conditions of the failed scan which, in some cases, can be used by the asset management system 205, for instance, to update corresponding asset repository records, prioritize future efforts to detect and scan the particular device, develop scans for the particular device, etc. In the case of an at least somewhat successful scan 525, scan results 530 can communicate attributes of the scanned device obtained in the scan 525.

Figure 5D:
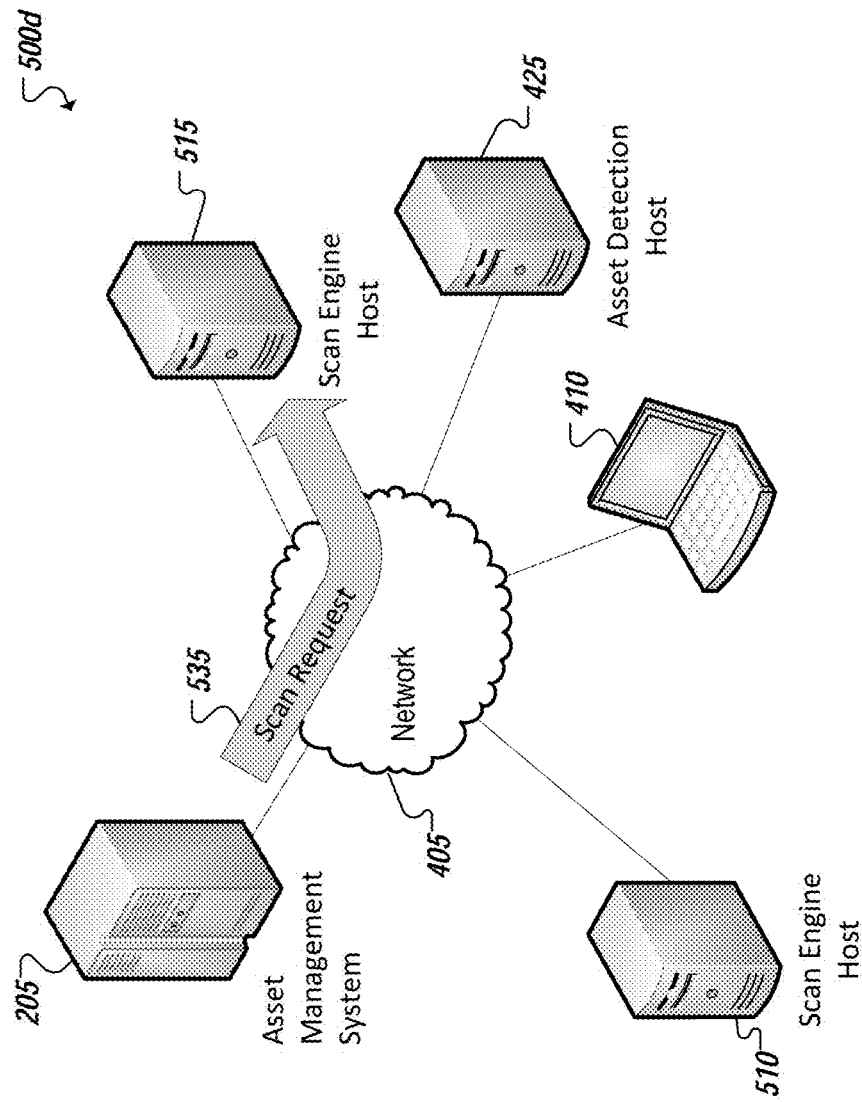
Figure 5E:
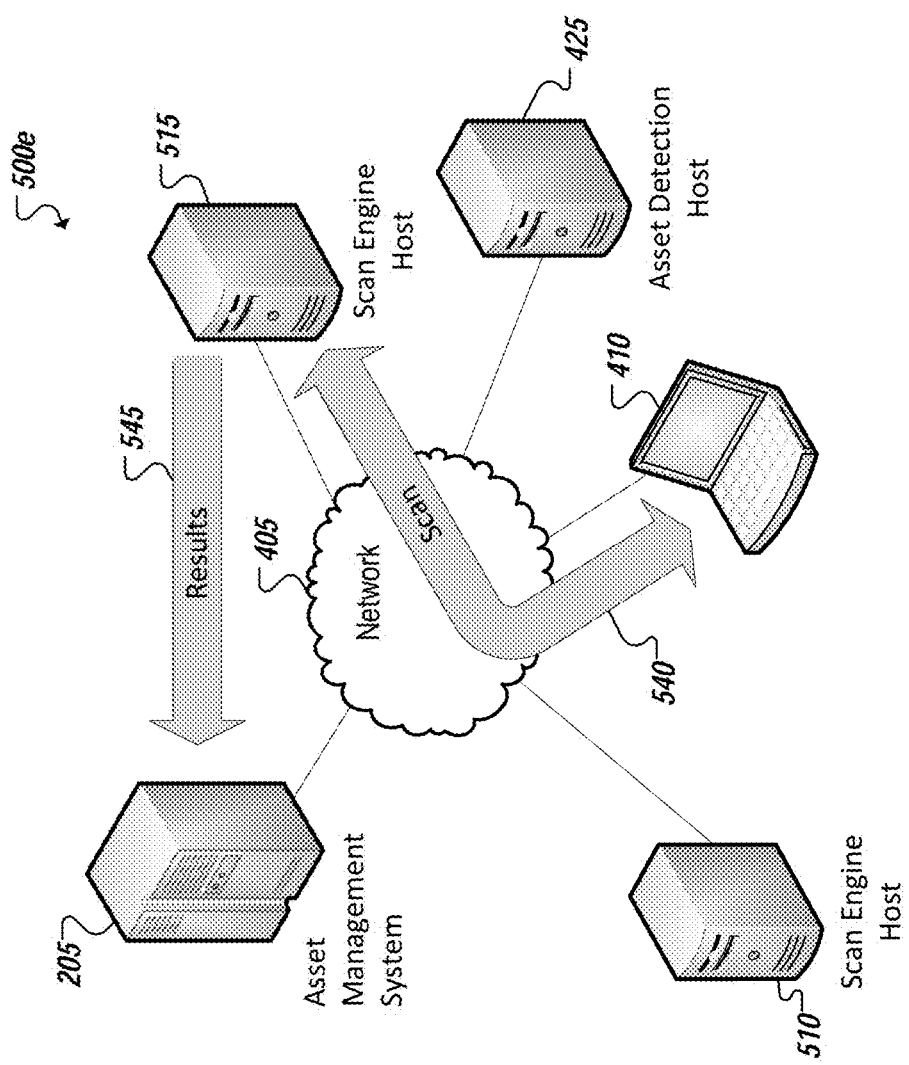

In some implementations, as scan results (e.g., 530) are returned to an asset management system 205, the scan results can inform the asset management system 205 of the progress or outcomes of the scan 525 as well as other scans on the detected device or other devices in the network. In some cases, based on scan results received from a particular scan engine (e.g., 510) the asset management system 205 can add, change, skip, or otherwise modify originally planned and future scans or scan sets. For instance, a scan result from a network-based scan of one or a plurality of hosts within a computing environment can affect (e.g., trigger, add, cancel, modify) another network-based scan of the same or other remote hosts. A scan result from a network-based scan can also be used to affect (e.g., trigger, add, cancel, modify) a host-based scan related (e.g., in the same scan set) managed by the asset management system 205, among other examples. For instance, as shown in the example of FIG. 5D, in addition to a scan 525 being identified for host device 410 in response to its detection by asset detection engine 425, a second scan, utilizing a second scan engine 515 can be identified. Accordingly, a scan request 535 can be sent to scan engine 515 providing instructions for performing the second scan 540 on detected host 410 (as shown in FIG. 5E). In one example, the second scan can be a scan conditioned, at least in part, on the results 530 of scan 525. For instance, the type and substance of the second scan, as well as whether the second scan 540 is at all performed, can be based, at least in part, on the results 530 of another scan 525. In other instances, asset management system 205 can identify multiple scans for a detected device and invoke multiple scan engines to complete the scans, causing scan requests 520, 535 to be sent to scan engines 510, 515 substantially concurrently and causing the corresponding scans to be carried out substantially in parallel. Finally, the scan results 530, 545 of all scans 525, 540 requested by the asset management system 205 in response to the detection of a particular target host device (e.g., 410).

It should be appreciated that the examples described and illustrated in connection with the Figures are non-limiting examples provided solely for purposes of illustrating various concepts addressed in this disclosure. For instance, techniques, operations, and system and component architectures can be adopted that are different from the example techniques, systems, and tools described above but that nonetheless apply at least some of the principles dealt with in this disclosure. For instance, asset management system can delegate certain functionality to other components, including scan engines, asset detection engines, or systems hosting the scan engines and asset detection engines. As an example, in some implementations, an asset detection engine may, in certain circumstances, be equipped with logic (and authorization) to trigger certain scans of certain host devices detected using the asset detection engine, among other examples. Additionally, it should be appreciated that, in practice, a computing environment can include hundreds to thousands of various potential scan targets of a myriad of different types and configurations. A correspondingly diverse array of scans can be developed and maintained by an at least partially centralized asset management system for use by various scan engines in scanning all or a portion of the computing environment, including even a single component of the computing environment. Similarly, a diverse and expandable set of asset detection techniques can be employed, among other examples.

Figure 6:
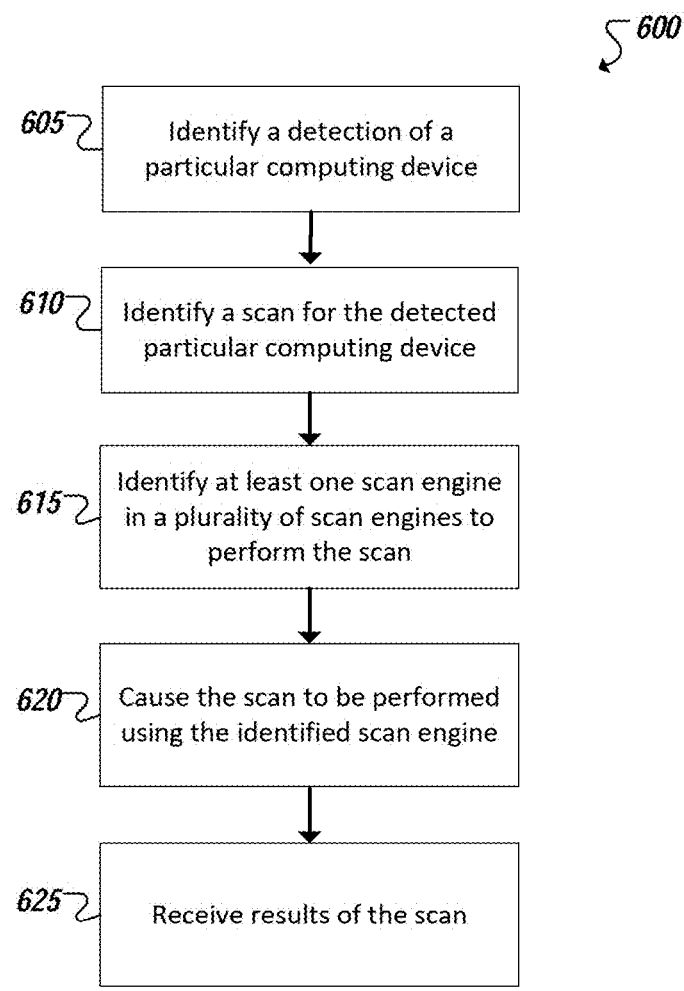
FIG. 6 is a simplified flowchart illustrating example techniques for scanning portions of a computing environment in accordance with at least one embodiment.

Turning to FIG. 6, a simplified flowchart 600 is shown illustrating example techniques relating to the opportunistic scanning of devices in a network based on the dynamic detection of the device on the network. For instance, the detection of a particular computing device in a plurality of computing devices on a network can be identified 605, for instance, from detection messages received by one or more asset detection tools on the network. A scan can be identified 610 for the detected device, for instance, in an attempt to perform one or more scans on the detected device while the device remains on the network and can be scanned by one or more scan engines in the network. Indeed, scan engines adapted to perform the identified scans can be identified 615 that are able to perform the identified scan on the detected device. Further, the identified scan engine can be caused 620 to perform the identified scan, for instance, through the sending of a scan request to the identified scan engine. In some instances, the scan request can include one or more scan scripts that, when executed by the identified scan engine, cause the scan engine to perform the requested scan. In some cases, identification of scans, scan engines for performing the scan, and performance of the scan can be carried out substantially immediately upon the detection of the device, for instance, based on a prior identification of the device as one for which is the scan is a priority. Scan results can be generated from the scans and these scan results can be received 625 from the scan engine performing the scan. In some implementations, an at least partially centralized manager can identify 605 the detection of the device (e.g., as communicated by an asset detection tool), identify 610 the scan and the scan engine (e.g., at 615) and send a scan request to the scan engine, and further receive 625 and process results of the scan. Such a manager can include an asset management system interfacing with asset detection engines detecting devices within the network and further interfacing and managing scan engines performing scans of devices within the network.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. In one alternative system or tool, the wireless authentication functionality of a simplified mobile communication device can be employed on a removable storage device, such as a portable hard drive, thumb drive, or the like. In such instances, the removable storage device can lack a user interface but possess wireless access functionality for connecting to cooperating computing devices over a short-range network, such as Bluetooth, and sharing authentication data with the cooperating computing devices over the short-range network to authenticate the holder of the wireless, portable storage device to one or more cooperating computing devices, allowing the user to both gain access to (and secure) the cooperating computing device through the wireless storage device as well as access, consume, and modify data stored on the hard drive using the authenticated-to cooperating computing device. Other systems and tools can also make use of principles of this disclosure. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, loadbalancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-topeer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one machine accessible storage medium having instructions stored thereon, the instructions when executed on a machine, cause the machine to:
   identify that a particular computing device has re-entered a network of a computing environment based on detection of the computing device on the network by an asset detection tool, wherein the particular computing device comprises a computing device previously detected on the network;
   determine that the particular computing device is included in a listing of a particular plurality of computing devices previously detected on the network for which vulnerability scans are to be opportunistically performed when each of the plurality of computing devices are re-detected on the network;
   determine an opportunity to perform at least two of a plurality of scans on the detected particular computing device based on the detection of the particular computing device, wherein the at least two scans comprises a first scan to detect whether the particular computing device possesses at least a first vulnerability and a second scan to detect whether the particular computing device possesses a different, second vulnerability;
   identify a first scan engine, in a plurality of scan engines, associated with the asset detection tool and adapted to perform at least the first scan;
   identify a second scan engine, in the plurality of scan engines, associated with the asset detection tool and adapted to perform the second scan; and
   cause the first scan engine to perform the first scan on the detected particular computing device and the second scan engine to perform the second scan on the detected particular computing device while the detected particular computing device remains on the network, wherein causing the first scan to be performed comprises sending a scan request to the identified first scan engine, and the scan request includes a scan script executable by the first scan engine to cause the first scan engine to perform the first scan.

2. The storage medium of claim 1, wherein the first scan engine is remote from the detected particular computing device.

3. The storage medium of claim 2, wherein the first scan engine is adapted to perform network-based scans of remote computing devices.

4. The storage medium of claim 1, wherein the instructions, when executed, further cause the machine to scan results of the performed first scan.

5. The storage medium of claim 1, wherein the particular computing device is a mobile computing device.

6. The storage medium of claim 1, wherein the particular computing device is detected by an asset detection tool on the network and detection of the particular computing device is identified from a message from the asset detection tool.

7. The storage medium of claim 6, wherein the asset detection tool is a passive detection tool.

8. The storage medium of claim 7, wherein the particular computing device was detected from data collected by a service in the network in connection with an event identified by the service.

9. The storage medium of claim 7, wherein the particular computing device was detected from address information corresponding to the particular computing device included in traffic communicated in the network.

10. The storage medium of claim 7, wherein the particular computing device was detected from address information added to a data store of a service within the network.

11. The storage medium of claim 6, wherein the particular first scan engine and second scan engine are identified as associated with the asset detection tool detecting the particular computing device and the asset detection tool is one of a plurality of asset detection tools in the computing environment.

12. The storage medium of claim 11, wherein identifying the scan engines associated with the asset detection tool includes querying a mapping of scan engines to asset detection tools.

13. The storage medium of claim 6, wherein the asset detection tool is an active detection tool adapted to probe computing devices and detect whether computing devices are present on the network based on the probing.

14. The storage medium of claim 1, wherein the instructions, when executed, further cause the machine to identify that the particular computing device is designated as a device to be scanned using the first scan in response to detection of the particular computing device within networks of the computing environment.

15. The storage medium of claim 1, wherein the instructions, when executed, further cause the machine to:
identify detection of a second computing device on the network of the computing environment;
identify another plurality of scans to be performed on the detected second computing device;
identify a set of scan engines, in the plurality of scan engines, adapted to perform the other plurality of scans; and
cause the other plurality of scans to be performed on the detected second computing device while the detected second computing device is on the network using the set of scan engines.

16. A method comprising:
identifying, using at least one processing device, that a particular computing device has re-entered a network of a computing environment based on detection of the computing device on the network by an asset detection tool, wherein the particular computing device comprises a computing device previously detected on the network;
determining that the particular computing device is included in a listing of a particular plurality of computing devices previously detected on the network for which vulnerability scans are to be opportunistically performed when each of the plurality of computing devices are re-detected on the network;
determining an opportunity to perform at least two of a plurality of scans on the detected particular computing device based on the detection of the particular computing device, wherein the at least two scans comprises a first scan to detect whether the particular computing device possesses at least a first vulnerability and a second scan to detect whether the particular computing device possesses a different, second vulnerability;
identifying a first scan engine, in a plurality of scan engines, associated with the asset detection tool and adapted to perform at least the first scan;
identify a second scan engine, in the plurality of scan engines, associated with the asset detection tool and adapted to perform the second scan; and
causing the first scan engine to perform the first scan on the detected particular computing device and the second scan engine to perform the second scan on the detected particular computing device while the detected particular computing device remains on the network, wherein causing the first scan to be performed comprises sending a scan request to the identified first scan engine, and the scan request includes a scan script executable by the first scan engine to cause the first scan engine to perform the first scan.

17. A system comprising:
at least one processor device;
at least one memory element; and
an asset manager, comprising code operable, when executed by the at least one processor device, to:
identify that a particular computing device has re-entered a network of a computing environment based on detection of the computing device on the network by an asset detection tool, wherein the particular computing device comprises a computing device previously detected on the network;
determine that the particular computing device is included in a listing of a particular plurality of computing devices previously detected on the network for which vulnerability scans are to be opportunistically performed when each of the plurality of computing devices are re-detected on the network;
determine an opportunity to perform at least two of a plurality of scans on the detected particular computing device based on the detection of the particular computing device, wherein the at least two scans comprises a first scan to detect whether the particular computing device possesses at least a first vulnerability and a second scan to detect whether the particular computing device possesses a different, second vulnerability;
identify a first scan engine, in a plurality of scan engines, associated with the asset detection tool and adapted to perform at least the first scan;
identify a second scan engine, in the plurality of scan engines, associated with the asset detection tool and adapted to perform the second scan; and
cause the first scan engine to perform the first scan on the detected computing device and the second scan engine to perform the second scan on the detected particular computing device while the detected computing device remains on the network, wherein causing the first scan to be performed includes sending a scan request to the identified first scan engine, and the scan request includes a scan script that, when executed by the first scan engine, causes the first scan engine to perform the first scan.

18. The system of claim 17, further comprising an asset detection engine adapted to detect activity of computing devices within the network and obtain identifications of the detected computing devices, wherein the asset detection engine comprises the first and second scan engines.

19. The system of claim 17, further comprising the plurality of scan engines.

* * * * *

UNITED STATES PATENT AND TRADEMARK OFFICE
CERTIFICATE OF CORRECTION

PATENT NO. : 9,516,451 B2  
APPLICATION NO. : 13/443729  
DATED : December 6, 2016  
INVENTOR(S) : James Michael Hugard, IV et al.

Page 1 of 1

It is certified that error appears in the above-identified patent and that said Letters Patent is hereby corrected as shown below:

On the Title Page

In Item (56), in Column 1, under "U.S. Patent Documents", Line 4, after "Kingsford" insert -- et al. --.

In Item (56), in Column 2, under "Other Publications", Lines 3-5, delete "International Preliminary Report on Patentability mailed Oct. 14, 2014 from International Application No. PCT/US2013/036025, 6 pages." and insert the same on first page, in Column 2, Line 4 as a new entry.

In Item (57), in Column 2, in "Abstract", Line 5, after "device" delete "can be".

Signed and Sealed this  
Seventh Day of March, 2017

Michelle K. Lee  
*Director of the United States Patent and Trademark Office*